United States Patent
Akula et al.

(10) Patent No.: US 11,576,179 B2
(45) Date of Patent: Feb. 7, 2023

(54) POWER RESERVATION AND DROPPING RULES FOR TRANSMISSION TIME INTERVALS

(71) Applicant: QUALCOMM Incorporated, San Diego, CA (US)

(72) Inventors: Prashanth Akula, Lake Bluff, IL (US); Seyedkianoush Hosseini, San Diego, CA (US); Peter Gaal, San Diego, CA (US); Tingfang Ji, San Diego, CA (US); Young Geun Cho, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 16/927,042

(22) Filed: Jul. 13, 2020

(65) Prior Publication Data

US 2020/0344760 A1 Oct. 29, 2020

Related U.S. Application Data

(62) Division of application No. 16/016,187, filed on Jun. 22, 2018, now Pat. No. 10,750,509.

(Continued)

(51) Int. Cl.
*H04W 4/00* (2018.01)
*H04W 72/044* (2023.01)
(Continued)

(52) U.S. Cl.
CPC ......... *H04W 72/0473* (2013.01); *H04L 5/001* (2013.01); *H04L 5/0082* (2013.01);
(Continued)

(58) Field of Classification Search
CPC .......... H04W 72/0473; H04W 52/325; H04W 52/346; H04W 52/367; H04W 72/0413;
(Continued)

(56) References Cited

U.S. PATENT DOCUMENTS 9,363,753 B2 * 6/2016 Damnjanovic ... H04W 52/0209
10,750,509 B2 * 8/2020 Akula ................ H04W 52/325
(Continued)

FOREIGN PATENT DOCUMENTS

CN 102550109 A 7/2012
CN 103931242 A 7/2014
(Continued)

OTHER PUBLICATIONS

Ericsson, PCMAX definition for UL CA with different TTI patterns across carriers, May 15-17, 2017, 3GPP TSG-RAN WG4#83, R4-1705092, pp. 1-4. (Year: 2017).*

(Continued)

*Primary Examiner* — Phuongchau Ba Nguyen
(74) *Attorney, Agent, or Firm* — Holland & Hart LLP

(57) ABSTRACT

Methods, systems, and devices for wireless communication are described. A user equipment (UE) may group multiple carriers with transmission time intervals (TTIs) having different durations into different physical uplink control channel (PUCCH) groups. The UE may reserve power per each PUCCH group. Alternatively, the UE may reserve power per each TTI duration across the one or more PUCCH groups.

16 Claims, 19 Drawing Sheets

Related U.S. Application Data

(60) Provisional application No. 62/543,620, filed on Aug. 10, 2017.

(51) Int. Cl.

| | | |
|---|---|---|
| *H04L 5/00* | (2006.01) | |
| *H04W 52/34* | (2009.01) | |
| *H04W 52/32* | (2009.01) | |
| *H04W 52/36* | (2009.01) | |
| *H04W 72/04* | (2023.01) | |
| *H04W 52/14* | (2009.01) | |
| *H04W 72/0446* | (2023.01) | |

(52) U.S. Cl.
CPC ....... *H04W 52/325* (2013.01); *H04W 52/346* (2013.01); *H04W 52/367* (2013.01); *H04W 72/0413* (2013.01); *H04L 5/0007* (2013.01); *H04L 5/0091* (2013.01); *H04W 52/146* (2013.01); *H04W 72/0446* (2013.01)

(58) Field of Classification Search
CPC .......... H04W 52/146; H04W 72/0446; H04W 28/04; H04W 72/04; H04W 72/042; H04W 88/08; H04L 5/001; H04L 5/0082; H04L 5/0007; H04L 5/0091
See application file for complete search history.

(56) References Cited

U.S. PATENT DOCUMENTS

| | | | | |
|---|---|---|---|---|
| 10,945,213 | B2* | 3/2021 | Pintado | H04W 52/0261 |
| 2012/0147801 | A1* | 6/2012 | Ho | H04W 52/365 |
| | | | | 370/311 |
| 2012/0224552 | A1* | 9/2012 | Feuersanger | H04L 5/0037 |
| | | | | 370/329 |
| 2016/0205632 | A1* | 7/2016 | Yi | H04W 52/367 |
| | | | | 455/522 |
| 2016/0255594 | A1 | 9/2016 | Vajapeyam et al. | |
| 2016/0255676 | A1 | 9/2016 | Vajapeyam et al. | |
| 2016/0330698 | A1* | 11/2016 | Loehr | H04W 52/241 |
| 2017/0215149 | A1 | 7/2017 | Zhang et al. | |
| 2018/0176938 | A1* | 6/2018 | Shao | H04W 72/0493 |
| 2018/0359123 | A1* | 12/2018 | Kimura | H04W 76/27 |
| 2019/0053242 | A1 | 2/2019 | Akula et al. | |
| 2020/0329437 | A1* | 10/2020 | MolavianJazi | H04W 76/15 |
| 2022/0104121 | A1* | 3/2022 | Park | H04W 8/24 |

FOREIGN PATENT DOCUMENTS

| | | |
|---|---|---|
| EP | 2378819 A2 | 10/2011 |
| WO | WO2015122695 A1 | 8/2015 |

OTHER PUBLICATIONS

Taiwan Search Report—TW107121681—TIPO—dated Sep. 7, 2021 (175791TW).

Ericsson: "MPR/A-MPR Measurement Window for Single Carrier and CAin sTTI Operation",3GPP Draft; R4-1705093 MPR-AMPR and EVM for STTI, 3rd Generation Partnership Project (3GPP), Mobile Competence Centre; 650, Route Des Lucioles; F-06921 Sophia-Antipolis Cedex; France, vol. RAN WG4, no. Hangzhou, China; Apr. 15, 2017-Apr. 19, 2017 May 14, 2017 (May 14, 2017), XP051277245,5 pages, Retrieved from the Internet: URL: http://www.3gpp.org/ftp/Meetings_3GPP_SYNC/RAN4/Docs/ [retrieved on May 14, 2017].

Ericsson: "PCMAX definition for UL CA with Different TTI Patterns Across Carriers",3GPP Draft; R4-1705092 PCMAX Issues for STTI in UL CA VER03, 3rd Generation Partnership Project (3GPP), Mobile Competence Centre; 650, Route Des Lucioles; F-06921 Sophia-Antipolis Cedex; France,vol. RAN WG4, no. Hangzhou, China; May 15, 2017-May 19, 2017, May 14, 2017 (May 14, 2017), XP051277244, 3 pages, Retrieved from the Internet: URL: http://www.3gpp.org/ftp/Meetings_3GPP_SYNC/RAN4/Docs/ [retrieved on May 14, 2017].

International Search Report and Written Opinion—PCT/US2018/039329—ISA/EPO—dated Sep. 13, 2018.

Qualcomm Incorporated: "PCmax Computation and Evaluation for CA with sTTI",3GPP Draft; R4-1705571 PCMAX for CA With STTI, 3rd Generation Partnership Project (3GPP), Mobile Competence Centre ; 650, Route Des Lucioles ; F-06921 Sophia-Antipolis Cedex; France,vol. RAN WG4, no. Hangzhou, China; May 15, 2017-May 19, 2017 May 14, 2017 (May 14, 2017), XP051277640, 3 pages, Retrieved from the Internet: URL: http://www.3gpp.org/ftp/Meetings_3GPP_SYNC/RAN4/Docs/ [retrieved on May 14, 2017].

\* cited by examiner

POWER RESERVATION AND DROPPING RULES FOR TRANSMISSION TIME INTERVALS

CROSS REFERENCES

The present Application for Patent is a Divisional of U.S. patent application Ser. No. 16/016,187 by AKULA et al., entitled "POWER RESERVATION AND DROPPING RULES FOR TRANSMISSION TIME INTERVALS" filed Jun. 22, 2018, which claims the benefit of U.S. Provisional Patent Application No. 62/543,620 by AKULA, et al., entitled "POWER RESERVATION AND DROPPING RULES FOR TRANSMISSION TIME INTERVALS," filed Aug. 10, 2017, assigned to the assignee hereof, and expressly incorporated by reference in its entirety.

BACKGROUND

The following relates generally to wireless communication, and more specifically to power reservation and dropping rules for transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support communication between a UE and a base station on multiple aggregated component carriers, referred to as carrier aggregation (CA). In some cases, a UE may transmit uplink signals on different component carriers during TTIs having different durations. Additionally, the UE may transmit one or more groups of uplink signals on the component carriers. However, in some cases, it may be challenging to allocate power for every component carrier when different TTI durations and different groups of component carriers are used, which may result in an inadequate amount of power for all TTIs of each component carrier.

SUMMARY

The described techniques relate to improved methods, systems, devices, or apparatuses that support power reservation and dropping rules for transmission time intervals (TTIs). Generally, the described techniques provide for reserving power for TTIs that have different durations, where respective power reservations for different TTI durations may be used to calculate a maximum transmit power at a user equipment (UE). For example, TTIs of different component carriers (CCs) in a carrier aggregation (CA) configuration may be grouped together based on TTI duration, and each group of TTIs may have its own reserved power allocation. A maximum transmit power limit may then be determined based on a sum of the reserved powers for each of the TTI groups. Additional power may also be reserved to supplement the respective power reservations for each TTI group. This additional power may be applied to any TTI group based on priority rules or based on a temporally first TTI group that exceeds its reserved power. The additional power may be added to the previously reserved power allocation for that TTI group. In some examples, the reserved power for each group of TTIs with the same TTI duration may be scaled based on a content to be transmitted on the CCs within the group. For example, certain types of content or different signals may have a different priority, and the power reservation for individual TTIs within a group of TTIs having the same TTI duration may be based on the priority of content for each TTI.

Additionally, in case of collision between different TTIs, a priority may be determined for different TTI durations that collide. In such cases, one or more symbol periods may be dropped in a lower-priority TTI, and additional power may be allocated to a higher-priority TTI. For example, shorter duration TTIs may be prioritized over longer duration TTIs, such that messaging associated with the shorter duration TTIs are transmitted while messaging associated with the longer duration TTIs is dropped. In some cases, priority may be based on a content of messaging in each TTI, where higher priority messaging is transmitted and lower priority messaging is dropped. In some cases, the UE may drop channels from a lowest serving cell index to a highest serving cell index in a predetermined order until a total transmit power of the UE does not exceed a maximum transmit power limit.

Additionally or alternatively, different CCs may be grouped together based on an association with different physical uplink control channel (PUCCH) groups, and power reservations may be configured for each PUCCH group. In such cases, power may be reserved for different TTI durations within respective PUCCH groups, based on a priority of different TTI durations. The power reservation schemes described herein may be configured by a base station and may be provided to the UE via semi-static signaling or through transmit power control mechanisms. In the case of a collision between two or more TTIs, a determined higher-priority TTI may be transmitted within a PUCCH group, while a lower-priority TTI may be dropped according to a similar determination as described above (e.g., based on a TTI length or content of the TTI).

A method of wireless communication is described. The method may include receiving, from a base station, power reservation information for TTIs to be used with a set of CCs of a carrier aggregation (CA) mode, categorizing, by TTI duration, the TTIs of the set of CCs into respective groups of TTIs, identifying a reserved power for each respective group of TTIs of the set of CCs based on the received power reservation information, determining a maximum transmit power limit based on a sum of the reserved powers, and transmitting during the TTIs of the set of CCs using a transmit power that is less than the determined maximum transmit power limit.

An apparatus for wireless communication is described. The apparatus may include means for receiving, from a base station, power reservation information for TTIs to be used with a set of CCs of a CA mode, means for categorizing, by TTI duration, the TTIs of the set of CCs into respective groups of TTIs, means for identifying a reserved power for each respective group of TTIs of the set of CCs based on the received power reservation information, means for determining a maximum transmit power limit based on a sum of the reserved powers, and means for transmitting during the TTIs of the set of CCs using a transmit power that is less than the determined maximum transmit power limit.

Another apparatus for wireless communication is described. The apparatus may include a processor, memory in electronic communication with the processor, and instructions stored in the memory. The instructions may be operable to cause the processor to receive, from a base station, power reservation information for TTIs to be used with a set of CCs of a CA mode, categorize, by TTI duration, the TTIs of the set of CCs into respective groups of TTIs, identify a reserved power for each respective group of TTIs of the set of CCs based on the received power reservation information, determine a maximum transmit power limit based on a sum of the reserved powers, and transmit during the TTIs of the set of CCs using a transmit power that is less than the determined maximum transmit power limit.

A non-transitory computer readable medium for wireless communication is described. The non-transitory computer-readable medium may include instructions operable to cause a processor to receive, from a base station, power reservation information for TTIs to be used with a set of CCs of a CA mode, categorize, by TTI duration, the TTIs of the set of CCs into respective groups of TTIs, identify a reserved power for each respective group of TTIs of the set of CCs based on the received power reservation information, determine a maximum transmit power limit based on a sum of the reserved powers, and transmit during the TTIs of the set of CCs using a transmit power that is less than the determined maximum transmit power limit.

Some examples of the method, apparatuses, and non-transitory computer-readable medium described herein may further include operations, features, means, or instructions for dropping a transmission based on content or length of a first TTI of the TTIs and allocating the transmit power based on the dropping.

Some examples of the method, apparatuses, and non-transitory computer-readable medium described herein may further include operations, features, means, or instructions for dropping the transmission may be based on the content of the first TTI, and where the content of the first TTI includes a PUCCH, or a PUSCH with uplink control information (UCI), or a PUSCH without UCI, or a reference signal.

Some examples of the method, apparatuses, and non-transitory computer-readable medium described herein may further include operations, features, means, or instructions for dropping the transmission may be based on the length of the first TTI, and where the length of the first TTI is a subframe or a slot.

Some examples of the method, apparatuses, and non-transitory computer-readable medium described herein may further include operations, features, means, or instructions for dropping at least a portion of a first TTI of the TTIs based on at least one dropping rule and allocating the transmit power based on the dropping.

Some examples of the method, apparatuses, and non-transitory computer-readable medium described herein may further include operations, features, means, or instructions for dropping at least a portion of a first TTI of the TTIs based on a priority of content scheduled to be transmitted in the first TTI and allocating the transmit power based on the dropping.

Some examples of the method, apparatuses, and non-transitory computer-readable medium described herein may further include operations, features, means, or instructions for dropping at least a portion of a first TTI of the TTIs based on a duration of the first TTI and allocating the transmit power based on the dropping.

Some examples of the method, apparatuses, and non-transitory computer-readable medium described herein may further include operations, features, means, or instructions for determining first content of a first control channel group scheduled to be transmitted during a first TTI of the TTIs and second content of a second control channel group scheduled to be transmitted during a second TTI of the TTIs, dropping at least a portion of the first TTI or the second TTI based on a priority of the first content and a priority of the second content and allocating the transmit power based on the dropping.

Some examples of the method, apparatuses, and non-transitory computer-readable medium described herein may further include operations, features, means, or instructions for dropping at least a portion of a first TTI of the TTIs based on whether content scheduled to be transmitted in the first TTI includes uplink control information and allocating the transmit power based on the dropping.

Some examples of the method, apparatuses, and non-transitory computer-readable medium described herein may further include operations, features, means, or instructions for dropping at least a portion of a first TTI of the TTIs based on whether a signal scheduled to be transmitted within the first TTI may be a reference signal and allocating the transmit power based on the dropping.

Some examples of the method, apparatus, and non-transitory computer-readable medium described above may further include processes, features, means, or instructions for receiving the power reservation information via semi-static signaling from the base station or via a transmit power control command from the base station. In some examples of the method, apparatus, and non-transitory computer-readable medium described above, the semi-static signaling includes radio resource control (RRC) messaging.

In some examples of the method, apparatus, and non-transitory computer-readable medium described above, determining the maximum transmit power limit includes determining a total transmit power based on the sum of the reserved powers. Some examples of the method, apparatus, and non-transitory computer-readable medium described above may further include processes, features, means, or instructions for identifying an additional reserved power indicated by the power reservation information, where a sum of the total transmit power and the additional reserved power may be less than or equal to the maximum transmit power limit.

Some examples of the method, apparatus, and non-transitory computer-readable medium described above may further include processes, features, means, or instructions for allocating the additional reserved power to a first TTI group of the respective groups of TTIs based on a TTI priority, where a total power of the first TTI group may be greater than a reserved power of the first TTI group. In some examples of the method, apparatus, and non-transitory computer-readable medium described above, the TTIs of the first TTI group may have a first TTI duration that may be shorter than a second TTI duration of another TTI.

Some examples of the method, apparatus, and non-transitory computer-readable medium described above may further include processes, features, means, or instructions for allocating the additional reserved power to a first TTI group of the respective groups of TTIs, a reserved power of the first TTI group being exceeded before other respective groups of TTIs exceed other respective reserved powers, where a total power of the first TTI group may be greater than the reserved power of the first TTI group.

Some examples of the method, apparatus, and non-transitory computer-readable medium described above may further include processes, features, means, or instructions for determining a content to be transmitted on each CC of the set of CCs and during each respective group of TTIs. Some examples of the method, apparatus, and non-transitory computer-readable medium described above may further include processes, features, means, or instructions for scaling a transmit power for each respective group of TTIs based on a priority of the content.

Some examples of the method, apparatus, and non-transitory computer-readable medium described above may further include processes, features, means, or instructions for identifying two of more CCs of the set of CCs that transmit a same content using a same TTI duration. Some examples of the method, apparatus, and non-transitory computer-readable medium described above may further include processes, features, means, or instructions for scaling the transmit power for the two or more CCs based on a priority of the content. In some examples of the method, apparatus, and non-transitory computer-readable medium described above, the content includes a PUCCH, or a physical uplink shared channel (PUSCH) comprising uplink control information (UCI), or a PUSCH that does not include UCI, or a sounding reference signal (SRS).

Some examples of the method, apparatus, and non-transitory computer-readable medium described above may further include processes, features, means, or instructions for identifying a collision between a first TTI having a first duration and a second TTI having a second duration to be transmitted on the set of CCs, the second duration being less than the first duration. Some examples of the method, apparatus, and non-transitory computer-readable medium described above may further include processes, features, means, or instructions for determining a priority of the first TTI and the second TTI. Some examples of the method, apparatus, and non-transitory computer-readable medium described above may further include processes, features, means, or instructions for dropping one or more symbol periods of the first TTI or the second TTI having a lowest priority based on the determined priority. Some examples of the method, apparatus, and non-transitory computer-readable medium described above may further include processes, features, means, or instructions for allocating a reserved power to the first TTI or the second TTI having a highest priority based on the determined priority.

A method of wireless communication is described. The method may include identifying TTIs of a set of CCs of a CA mode, categorizing, by TTI duration, the TTIs of the set of CCs into respective groups of TTIs, determining a reserved power for each respective group of TTIs of the set of CCs based on the TTI duration, and transmitting, to a UE, power reservation information that indicates the reserved power for each respective group of TTIs.

An apparatus for wireless communication is described. The apparatus may include means for identifying TTIs of a set of CCs of a CA mode, means for categorizing, by TTI duration, the TTIs of the set of CCs into respective groups of TTIs, means for determining a reserved power for each respective group of TTIs of the set of CCs based on the TTI duration, and means for transmitting, to a UE, power reservation information that indicates the reserved power for each respective group of TTIs.

Another apparatus for wireless communication is described. The apparatus may include a processor, memory in electronic communication with the processor, and instructions stored in the memory. The instructions may be operable to cause the processor to identify TTIs of a set of CCs of a CA mode, categorize, by TTI duration, the TTIs of the set of CCs into respective groups of TTIs, determine a reserved power for each respective group of TTIs of the set of CCs based on the TTI duration, and transmit, to a UE, power reservation information that indicates the reserved power for each respective group of TTIs.

A non-transitory computer readable medium for wireless communication is described. The non-transitory computer-readable medium may include instructions operable to cause a processor to identify TTIs of a set of CCs of a CA mode, categorize, by TTI duration, the TTIs of the set of CCs into respective groups of TTIs, determine a reserved power for each respective group of TTIs of the set of CCs based on the TTI duration, and transmit, to a UE, power reservation information that indicates the reserved power for each respective group of TTIs.

Some examples of the method, apparatus, and non-transitory computer-readable medium described above may further include processes, features, means, or instructions for transmitting the power reservation information to the UE via semi-static signaling or via a transmit power control command. In some examples of the method, apparatus, and non-transitory computer-readable medium described above, the semi-static signaling includes RRC messaging.

Some examples of the method, apparatus, and non-transitory computer-readable medium described above may further include processes, features, means, or instructions for determining an additional reserved power to use by the UE when calculating a maximum transmit power limit, where a sum of the sum of the reserved powers and the additional reserved power may be less than or equal to the maximum transmit power limit. Some examples of the method, apparatus, and non-transitory computer-readable medium described above may further include processes, features, means, or instructions for transmitting an indication of the additional reserved power in the power reservation information.

A method of wireless communication is described. The method may include receiving, from a base station, power reservation information for a set of CCs of a CA mode, respective CCs of the set of CCs associated with a first PUCCH group or a second PUCCH group, identifying a reserved power for each of the first PUCCH group and the second PUCCH group based on the received power reservation information, determining a maximum transmit power limit based on a sum of the reserved powers, and transmitting on the set of CCs using a transmit power that is less than or equal to the determined maximum transmit power limit.

An apparatus for wireless communication is described. The apparatus may include means for receiving, from a base station, power reservation information for a set of CCs of a CA mode, respective CCs of the set of CCs associated with a first PUCCH group or a second PUCCH group, means for identifying a reserved power for each of the first PUCCH group and the second PUCCH group based on the received power reservation information, means for determining a maximum transmit power limit based on a sum of the reserved powers, and means for transmitting on the set of CCs using a transmit power that is less than or equal to the determined maximum transmit power limit.

Another apparatus for wireless communication is described. The apparatus may include a processor, memory in electronic communication with the processor, and instructions stored in the memory. The instructions may be operable to cause the processor to receive, from a base station, power reservation information for a set of CCs of a CA mode, respective CCs of the set of CCs associated with a first PUCCH group or a second PUCCH group, identify a reserved power for each of the first PUCCH group and the second PUCCH group based on the received power reservation information, determine a maximum transmit power limit based on a sum of the reserved powers, and transmit on the set of CCs using a transmit power that is less than or equal to the determined maximum transmit power limit.

A non-transitory computer readable medium for wireless communication is described. The non-transitory computer-readable medium may include instructions operable to cause a processor to receive, from a base station, power reservation information for a set of CCs of a CA mode, respective CCs of the set of CCs associated with a first PUCCH group or a second PUCCH group, identify a reserved power for each of the first PUCCH group and the second PUCCH group based on the received power reservation information, determine a maximum transmit power limit based on a sum of the reserved powers, and transmit on the set of CCs using a transmit power that is less than or equal to the determined maximum transmit power limit.

Some examples of the method, apparatus, and non-transitory computer-readable medium described above may further include processes, features, means, or instructions for receiving the power reservation information via semi-static signaling from the base station or via a transmit power control command from the base station. In some examples of the method, apparatus, and non-transitory computer-readable medium described above, the semi-static signaling includes RRC messaging.

Some examples of the method, apparatus, and non-transitory computer-readable medium described above may further include processes, features, means, or instructions for receiving, within the power reservation information, an indication of reserved powers for respective groups of TTIs to be used with the first PUCCH group and the second PUCCH group. Some examples of the method, apparatus, and non-transitory computer-readable medium described above may further include processes, features, means, or instructions for determining the maximum transmit power limit based on a sum of the reserved powers for each respective group of TTIs.

Some examples of the method, apparatus, and non-transitory computer-readable medium described above may further include processes, features, means, or instructions for determining a content to be transmitted for the first PUCCH group and the second PUCCH group and during each respective group of TTIs. Some examples of the method, apparatus, and non-transitory computer-readable medium described above may further include processes, features, means, or instructions for scaling a transmit power of the first PUCCH group or the second PUCCH group based on a priority of the content and a TTI duration.

Some examples of the method, apparatuses, and non-transitory computer-readable medium described herein may further include operations, features, means, or instructions for dropping a transmission based on content or length of a first TTI of the respective groups of TTIs and allocating the transmit power based on the dropping.

Some examples of the method, apparatuses, and non-transitory computer-readable medium described herein may further include operations, features, means, or instructions for dropping at least a portion of a first TTI of the respective groups of TTIs based on at least one dropping rule and allocating the transmit power based on the dropping.

Some examples of the method, apparatuses, and non-transitory computer-readable medium described herein may further include operations, features, means, or instructions for dropping at least a portion of a first TTI of the respective groups of TTIs based on a priority of content scheduled to be transmitted in the first TTI and allocating the transmit power based on the dropping.

Some examples of the method, apparatuses, and non-transitory computer-readable medium described herein may further include operations, features, means, or instructions for dropping at least a portion of a first TTI of the respective groups of TTIs based on a duration of the first TTI and allocating the transmit power based on the dropping.

Some examples of the method, apparatuses, and non-transitory computer-readable medium described herein may further include operations, features, means, or instructions for determining first content of a first control channel group scheduled to be transmitted during a first TTI of the respective groups of TTIs and second content of a second control channel group scheduled to be transmitted during a second TTI of the respective groups of TTIs, dropping at least a portion of the first TTI or the second TTI based on a priority of the first content and a priority of the second content and allocating the transmit power based on the dropping.

Some examples of the method, apparatus, and non-transitory computer-readable medium described above may further include processes, features, means, or instructions for identifying a collision between a first TTI having a first duration and a second TTI having a second duration to be transmitted on the set of CCs, the second duration being less than the first duration. Some examples of the method, apparatus, and non-transitory computer-readable medium described above may further include processes, features, means, or instructions for determining a priority of the first TTI and the second TTI. Some examples of the method, apparatus, and non-transitory computer-readable medium described above may further include processes, features, means, or instructions for dropping one or more symbol periods of the first TTI or the second TTI having a lowest priority based on the determined priority. Some examples of the method, apparatus, and non-transitory computer-readable medium described above may further include processes, features, means, or instructions for allocating a reserved power to the first TTI or the second TTI having a highest priority based on the determined priority.

A method of wireless communication is described. The method may include identifying a set of CCs of a CA mode, respective CCs of the set of CCs being associated with a first PUCCH group or a second PUCCH group, determining a reserved power for each of the first PUCCH group and the second PUCCH group, and transmitting, to a UE, power reservation information that indicates the reserved power for each of the first PUCCH group and the second PUCCH group.

An apparatus for wireless communication is described. The apparatus may include means for identifying a set of CCs of a CA mode, respective CCs of the set of CCs being associated with a first PUCCH group or a second PUCCH group, means for determining a reserved power for each of the first PUCCH group and the second PUCCH group, and means for transmitting, to a UE, power reservation information that indicates the reserved power for each of the first PUCCH group and the second PUCCH group.

Another apparatus for wireless communication is described. The apparatus may include a processor, memory in electronic communication with the processor, and instructions stored in the memory. The instructions may be operable to cause the processor to identify a set of CCs of a CA mode, respective CCs of the set of CCs being associated with a first PUCCH group or a second PUCCH group, determine a reserved power for each of the first PUCCH group and the second PUCCH group, and transmit, to a UE, power reservation information that indicates the reserved power for each of the first PUCCH group and the second PUCCH group.

A non-transitory computer readable medium for wireless communication is described. The non-transitory computer-readable medium may include instructions operable to cause a processor to identify a set of CCs of a CA mode, respective CCs of the set of CCs being associated with a first PUCCH group or a second PUCCH group, determine a reserved power for each of the first PUCCH group and the second PUCCH group, and transmit, to a UE, power reservation information that indicates the reserved power for each of the first PUCCH group and the second PUCCH group.

Some examples of the method, apparatus, and non-transitory computer-readable medium described above may further include processes, features, means, or instructions for transmitting the power reservation information to the UE via semi-static signaling or via a transmit power control command.

DETAILED DESCRIPTION

Figure 1:
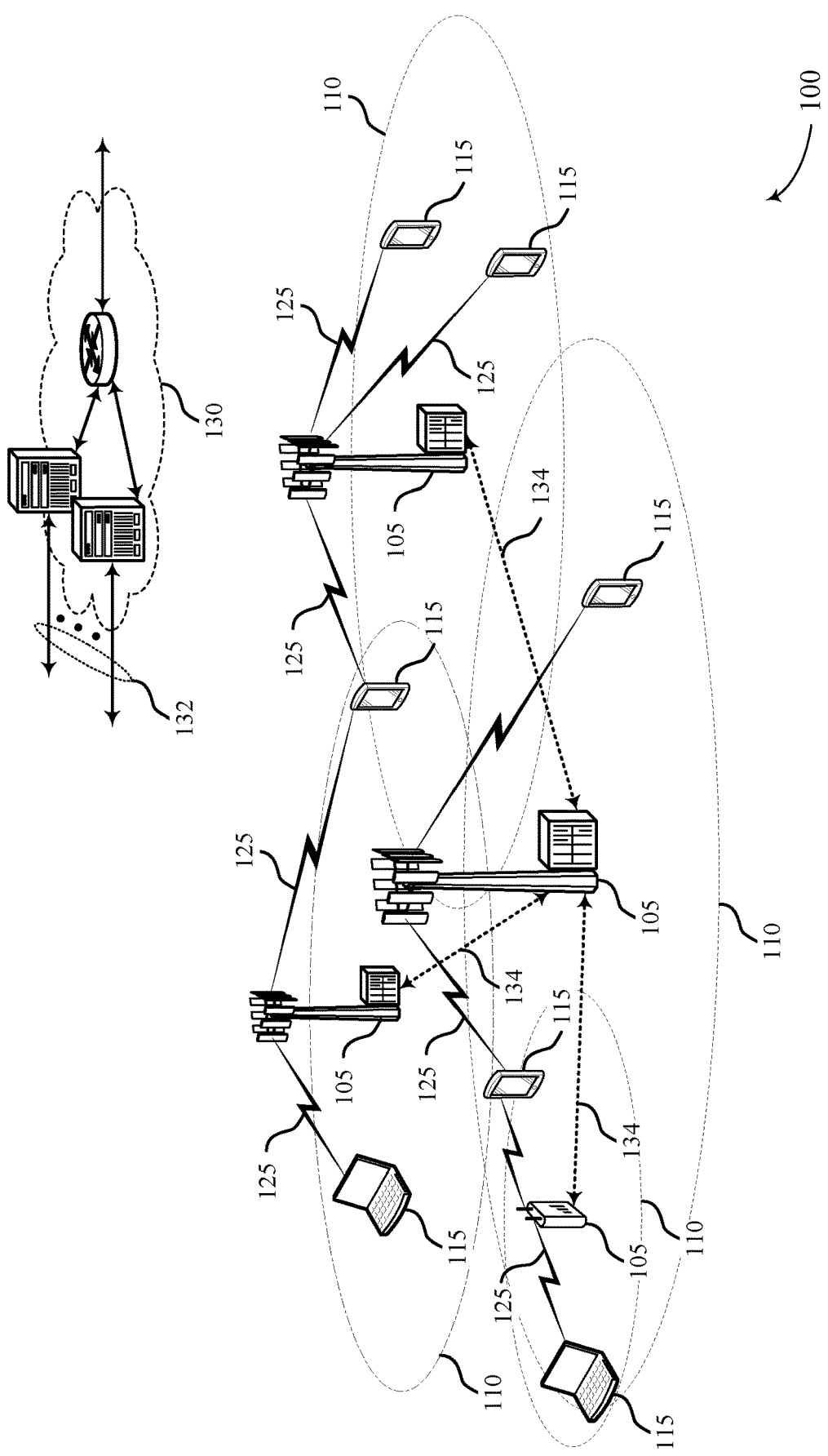
FIG. 1 illustrates an example of a system for wireless communication that supports power reservation and dropping rules for transmission time intervals (TTIs) in accordance with aspects of the present disclosure.

The described techniques provide for reserving power for TTIs that have different durations, where respective power reservations for different TTI durations may be used to calculate a maximum transmit power at a user equipment (UE). In an example, TTIs of different component carriers (CCs) in a carrier aggregation (CA) configuration may be grouped together based on TTI duration, and each group of TTIs may have its own reserved power allocation. Different CCs may be grouped together based on an association with different physical uplink control channel (PUCCH) groups, and power reservations may be configured for each PUCCH group. By reserving power based on TTIs or PUCCH groups, the power may be distributed among the different CCs or TTIs to ensure one CC or one TTI does not expend all of the available power. In some cases, a priority may be determined for different TTI durations in case of a collision between the different TTIs, and one or more symbol periods may be dropped in a lower-priority TTI. Additional power may be allocated from a dropped, lower priority TTI to a higher-priority TTI. In some cases, priority may be based on a content of messaging in each TTI of a collision, where higher priority messaging is transmitted and lower priority messaging is dropped.

A base station may, in some examples, configure different TTIs for communications with a UE. For example, wireless communications in such systems may use TTIs having a first duration (e.g., a 1 ms TTI) in addition to a shortened or short TTI (sTTI) having a second, shorter, duration (e.g., two orthogonal frequency-division multiplexing (OFDM) symbol periods, three OFDM symbol periods, seven OFDM symbol periods, a slot, and the like). Wireless communications using such sTTIs may be associated with low latency between downlink and uplink transmissions.

Some wireless communications systems may support communications between a UE and a base station on multiple aggregated CCs, a feature referred to as CA. In some cases, the base station may configure one or more (e.g., two) PUCCH groups of CCs for a UE's uplink transmissions, where different CCs within a PUCCH group may be associated with different length TTIs. For example, a CC of a PUCCH group may be associated with both first duration TTIs (e.g., 1 ms) and second duration sTTIs (e.g., two OFDM symbols). Respective PUCCH groups may include different combinations of TTI durations and sTTI durations.

Distributing sufficient power reservations to the different CCs or TTIs of a PUCCH group may be challenging. For example, based on a scheduling order for the different TTI durations, some TTIs may not be accorded sufficient transmit power. In such cases, a single CC may be unintentionally allocated most or all of the available power (e.g., up to a maximum power limit) that the UE may use in a single transmission, leaving insufficient transmit power for other TTIs on other CCs.

As described herein, the UE may efficiently allocate or reserve power such that, if different TTI durations are used for an uplink transmission, each TTI duration or each PUCCH group may have sufficient transmit power. For example, the UE may use power reservation per each PUCCH group and may reserve a subset of a total amount of power for each PUCCH group. In such cases, the UE may use a further power reservation within each PUCCH group based on priority rules or based on each TTI length. In some examples, the UE may reserve power per TTI length across the different CCs (e.g., included in different PUCCH groups). For example, the UE may reserve a total amount of power for TTIs of the same length regardless of PUCCH groups, and, in some examples, the total power may be allocated per TTI length based on the content of each CC. In some examples, the base station may signal the reserved power to the UE through semi-static or dynamic signaling.

In some cases, the base station may signal the reserved power through semi-static messaging (e.g., radio resource control (RRC) messaging). In some examples, the base station may signal the reserved power in a dynamic message (e.g., via transmit power control (TPC)). Additionally, the base station may implement a set of dropping rules for the UE to follow in case of conflicts between TTI durations, and power allocation for TTIs may be based on the dropping rules. For example, if different length TTIs are to be transmitted at the same time, the UE may prioritize a shorter duration TTI and drop the rest of the TTIs (e.g., having longer TTI durations). In cases where more than one TTI of the same length are to be transmitted at the same time, the UE may choose which TTI to prioritize and drop the rest. For example, the UE may choose which TTI to prioritize based on the data within each TTI or on a different factor.

Aspects of the disclosure are initially described in the context of wireless communications systems. Examples of a dropping scheme and a process flow that support power reservation and dropping rules for TTIs are then described. Aspects of the disclosure are further illustrated by and described with reference to apparatus diagrams, system diagrams, and flowcharts that relate to power reservation and dropping rules for transmission time intervals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Uplink power control may include a combination of open-loop and closed-loop mechanisms. In open-loop power control, a UE transmit power may depend on estimates of the downlink path-loss and channel configuration. In closed-loop power control, the network may directly control the UE transmit power using explicit power-control commands. Open-loop power control may be used for initial access, such as the transmission of a physical random access channel (PRACH) by a UE 115, whereas both open and closed loop control may be used for uplink control and data transmission. A UE 115 may determine power using an algorithm that takes into account a maximum transmission power limit, a target base station receive power, path loss, modulation and coding scheme (MCS), the number of resources used for transmission, and a format of the transmitted data (e.g., PUCCH format). Power adjustments may be made by a base station 105 using TPC messages, which may incrementally adjust the transmit power of the UE 115 as appropriate. Additionally, as described herein, power control may be semi-statically managed by the base station 105, or the UE 115 may implement rules for dropping certain transmissions (e.g., based on content or a length of a TTI) to further enhance control of the UE transmit power.

In wireless communications system 100, a UE 115 may simultaneously communicate on multiple carriers using TTIs having different durations (e.g., multiple CCs in a CA mode). In some cases, the UE 115 may group the multiple carriers with TTIs having different durations into different uplink groups (e.g., PUCCH groups), where the TTIs having different durations may include TTIs of a first duration (e.g., 1 ms) and sTTIs that consist of one or more OFDM symbols (e.g., two, three, or seven symbols). The uplink or PUCCH groups may include different combinations of TTIs and sTTIs (e.g., different TTI and sTTI durations). Additionally, CCs in each PUCCH groups may include different types of uplink data (e.g., PUCCH messages, physical uplink shared channel (PUSCH) messages, sounding reference signals (SRSs), uplink control information (UCI), etc.). In some cases, one or more CCs may utilize all of the available power allocated for uplink transmissions, which may result in no power being available for the remaining CCs.

Wireless communications system 100 may support power reservations for TTIs having different durations, where respective power reservations for different TTI durations may be used to calculate a maximum transmit power at the UE 115. For example, TTIs of different CCs may be grouped together based on TTI duration, and each group of TTIs with the same duration may have its own reserved power allocation. A maximum transmit power limit may then be determined based on a sum of the reserved powers for each of TTIs groups. Additional power may also be reserved to supplement the respective power reservations for each TTI group. This additional power may be applied to any TTI group based on priority rules or based on a temporally first TTI group to exceed its allocated power. In some examples, the reserved power for each group of TTIs with the same TTI duration may be scaled based on a content to be transmitted on the CCs during the TTIs of different durations. For example, certain types of content or different signals may have a different priority, and the power reservation for the TTIs (and CCs) carrying higher priority content. Additionally, in case of collision between a first TTI and a second TTI, a priority may be determined for one of the first or second TTIs (e.g., based on a TTI duration or TTI content). In such cases, one or more symbol periods may be dropped in a lower-priority TTI, and additional power may be allocated to a higher-priority TTI.

Additionally or alternatively, different CCs may be grouped together based on an association with different PUCCH groups, and power reservations may be configured for each PUCCH group. In such cases, power may also be reserved for different TTI durations within respective PUCCH groups, which may further take a priority of different TTI durations. The power reservation schemes described herein may be configured by a base station 105 and provided to the UE 115 via semi-static signaling or through TPC mechanisms.

Figure 2:
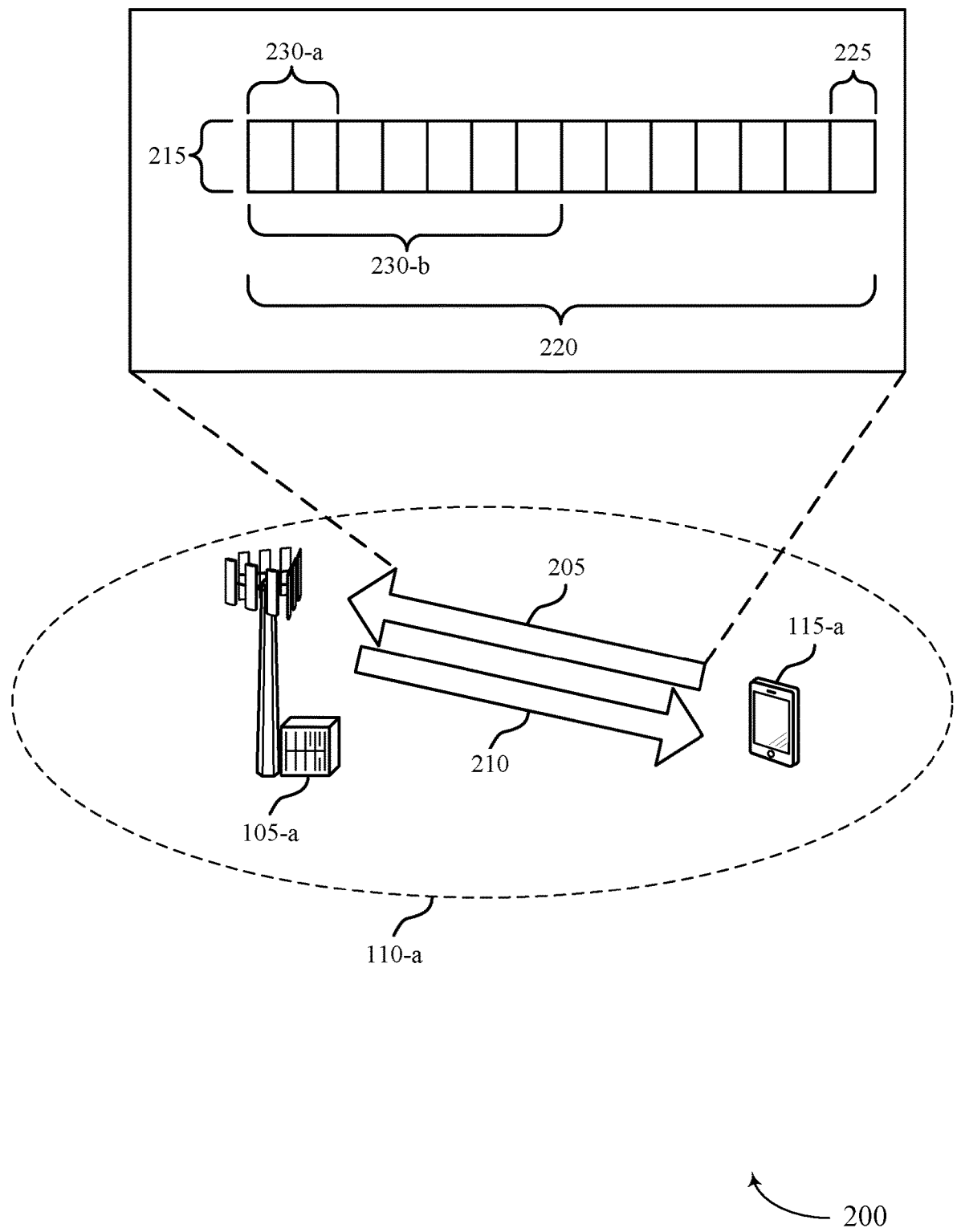
FIG. 2 illustrates an example of a wireless communications system that supports power reservation and dropping rules for TTIs in accordance with aspects of the present disclosure.

FIG. 2 illustrates an example of a wireless communications system 200 that supports power reservation and dropping rules for TTIs in accordance with various aspects of the present disclosure. In some examples, wireless communications system 200 may implement aspects of wireless communications system 100. Wireless communications system 200 may include base station 105-a and UE 115-a, which may be examples of corresponding base stations 105 and UEs 115 as described with reference to FIG. 1. In some examples, base station 105-a may be in communication with one or more UEs 115 within geographic coverage area 110-a. Wireless communications system 200 may illustrate PUCCH group scheduling by base station 105-a based on UE 115-a transmitting one or more PUCCH groups containing different length TTIs, where power may be reserved for different groups of TTIs or for different PUCCH groups.

UE 115-a may send uplink transmissions to base station 105-a over uplink communication link 205. Similarly, base station 105-a may send downlink transmissions to UE 115-a over downlink communication link 210. Wireless communications system 200 may support carrier aggregation, and base station 105-a may communicate with UE 115-a on resources of multiple carriers on uplink communications link 205. In some cases, wireless communications system 200 may support different TTI configurations 215 for communications data sent over uplink communications link 205 and downlink communications link 210. For example, TTI configuration 215 may be an example of an allocation of time-frequency resources for communications between UE 115-a and base station 105-a over uplink communications link 205.

TTI configuration 215 may include various configurations for TTIs utilized for transmitting data, control information, and reference signals during a TTI 220 (e.g., a legacy TTI, a subframe, a 1 ms TTI, etc.) consisting of multiple (e.g., 14) OFDM symbol periods 225. TTI configuration 215 may include a configuration of multiple sTTIs 230, including, for example, sTTIs 230-*a* having a duration of two symbol periods 225 or sTTIs 230-*b* having a duration of seven symbol periods 225. It is noted that an sTTI 230 described herein may be of any duration less than TTI 220, including the examples of the two-symbol and seven-symbol sTTIs 230. In some examples, communications between UE 115-*a* and base station 105-*b* may utilize groups (e.g., PUCCH groups) of one or a combination of TTIs having different durations for uplink transmissions over uplink communications link 205. For example, a PUCCH group may include a combination of TTIs 220 and sTTIs 230-*a* or a combination of TTIs 220 and sTTIs 230-*b*. For example, a first PUCCH group may include a combination of two TTIs 220 and four sTTIs 230-*a*, and a second PUCCH group may include a combination of one TTI 220 and three sTTIs 230-*b*. UE 115-*a* may need to transmit both PUCCH groups to base station 105-*a* over uplink communications link 205. However, when scheduling power control information, power may be allocated according to TTI length (i.e., TTIs 220 may be scheduled first, sTTIs 230-*b* may be scheduled next, and sTTIs 230-*a* may be scheduled last). In some cases, each TTI 220, sTTI 230-*a*, and sTTI 230-*b* may correspond to a different CC in a CA configuration, which may include different uplink data in each CC (e.g., PUCCH message, PUSCH message, SRS, UCI, etc.). As such, CCs with a length of TTI 220 may utilize an amount of power such that not enough power is available for CCs with a length of sTTIs 230-*b* or sTTIs 230-*a*.

Base station 105-*a* may transmit power reservation information to UE 115-*a* on downlink communications link 210 so that power may be allocated for each TTI 220 or sTTI 230 for CCs of both PUCCH groups. In some cases, the power reservation information may include reserved powers for each PUCCH group. UE 115-*a* may then allocate the power reserved for each CC within each PUCCH group based on priority rules or based on further power reservation for each TTI length within the PUCCH group. The priority rules may include assigning a higher priority for different types of uplink data (e.g., PUCCH has a higher priority than PUSCH with UCI, PUSCH with UCI has a higher priority than PUSCH without UCI, and PUSCH without UCI has a higher priority than SRS, etc.). Alternatively, the power reservation information may include reserved powers for each TTI length (e.g., TTIs 220, sTTIs 230-*a*, and sTTIs 230-*b*).

When the power reservation information includes reserved powers based on TTI length, the power reservation may include a total amount of power for TTIs with a same length that may span across one or more PUCCH groups. For example, the total power may be defined as:

$$P_{1msec} + P_{2os} + P_{7os} = P_{total} \leq P_{C_{max}} - \Delta \quad (1)$$

where $P_{1msec}$ corresponds to a total power for TTIs 220 (e.g., a 1 ms TTI), $P_{2os}$ corresponds to a total power for sTTIs 230-*a* having a duration of two OFDM symbols 225, $P_{7os}$ corresponds to a total power for sTTIs 230-*b* having a duration of seven OFDM symbols 225, $P_{total}$ corresponds to a total amount of power for uplink transmissions, $P_{C_{max}}$ corresponds to a maximum transmit power limit used for uplink transmissions, and $\Delta$ corresponds to extra power reserved. It is understood that TTIs of different length may also be used for such calculations, using corresponding power reservation values.

As described above, a first PUCCH group may include a combination of two TTIs 220 and four sTTIs 230-*a*, and a second PUCCH group may include a combination of one TTI 220 and three sTTIs 230-*b*. In such an example, three CCs may have a length of TTI 220 (e.g., two CCs from the first PUCCH group and one CC from the second PUCCH group), four CCs may have a length of sTTI 230-*a* (e.g., four CCs in the first PUCCH group), and three CCs may have a length of sTTI 230-*b* (e.g., three CCs in the second PUCCH group). The UE 115-*a* may allocate the total reserved power for each TTI length (i.e., $P_{1msec}$, $P_{2os}$, $P_{7os}$) for each CC within its respective TTI length such that the sum of the allocated powers for the CCs equals the total reserved power for the TTI length. For example, the total reserved power for TTIs 220 may be defined as:

$$P_a + P_b + P_c = P_{1msec} \quad (2)$$

where $P_a$ corresponds to an allocated power for a first CC with a length TTI 220 in the first PUCCH group, $P_b$ corresponds to an allocated power for a second CC with a length TTI 220 in the first PUCCH group, and $P_c$ corresponds to an allocated power for a third CC with a length TTI 220 in the second PUCCH group. Similarly, the total reserved power for sTTIs 230-*a* may be defined as:

$$P_a + P_b + P_c + P_d = P_{2os} \quad (3)$$

where $P_a$ corresponds to an allocated power for a first CC with a length sTTI 230-*a* in the first PUCCH group, $P_b$ corresponds to an allocated power for a second CC with a length sTTI 230-*a* in the first PUCCH group, $P_c$ corresponds to an allocated power for a third CC with a length sTTI 230-*a* in the first PUCCH group, and $P_d$ corresponds to an allocated power for a fourth CC with a length sTTI 230-*a* in the first PUCCH group. Similarly, the total reserved power for sTTIs 230-*b* may be defined as:

$$P_a + P_b + P_c = P_{7os} \quad (4)$$

where $P_a$ corresponds to an allocated power for a first CC with a length sTTI 230-*b* in the second PUCCH group, $P_b$ corresponds to an allocated power for a second CC with a length sTTI 230-*b* in the second PUCCH group, and $P_c$ corresponds to an allocated power for a third CC with a length sTTI 230-*b* in the second PUCCH group. The total power of each CC (i.e., $P_a$, $P_b$, $P_c$, or $P_d$) may not exceed the reserved power for its respective TTI length (e.g., $P_{1msec}$ for TTI 220, $P_{2os}$ for sTTI 230-*a*, $P_{7os}$ for sTTI 230-*b*, etc.).

In some examples, $\Delta$ may be 0 or another number chosen by base station 105-*a*. $\Delta$ may include an amount of extra power that can be utilized for one of the different TTI lengths if a total power for a group of TTIs exceeds the allocated power. The extra power may be utilized on a priority basis. In some cases, sTTIs 230-*a* may utilize the extra power since it is scheduled last for power control by base station 105-*a* (e.g., prioritize allocation of extra power to a TTI and/or sTTI based on scheduling). Alternatively, the extra power may be utilized by a TTI length group (e.g., TTIs 220, sTTIs 230-*a*, or sTTIs 230-*b*) that exceeds its reserved power limit first.

UE 115-*a* may allocate the reserved power for each TTI length to the CCs that have that TTI length based on a set of priority rules for the uplink data in each CC. For example, CCs that contain PUCCH messages may take priority to CCs that contain PUSCH messages with UCI. Additionally, CCs that contain PUSCH messages with UCI may take priority to CCs that contain PUSCH messages without UCI, and PUSCH messages without UCI may take priority to CCs that contain reference signals (e.g., SRS). In some cases, UCI may include HARQ acknowledgement (HARQ-ACK) messaging for previously received downlink messages. UE 115-a may allocate more of the total reserved power to CCs that have higher priority uplink data and may scale down the amount of power allocated for the other CCs. If two or more CCs in a given TTI length transmit the same priority uplink data, then UE 115-a may scale each CC down equally. For example, if two CCs within a given TTI length transmit PUSCH with UCI, then UE 115-a may scale both CCs down proportionally.

In some cases, base station 105-a may transmit the power reservation information semi-statically through RRC over downlink communications link 210. Alternatively, base station 105-a may transmit the power reservation information in a more dynamic manner via power control indications over downlink communications link 210. Additionally, UE 115-a may utilize a set of dropping rules in case of conflicting TTIs scheduled to be transmitted at the same time. In some cases, base station 105-a may determine the dropping rules in case of conflict and may transmit the rules to UE 115-a over downlink communications link 210. In some cases, UE 115-a may determine and utilize the dropping rules based on the different TTI durations and/or PUCCH groups.

Figure 3A:
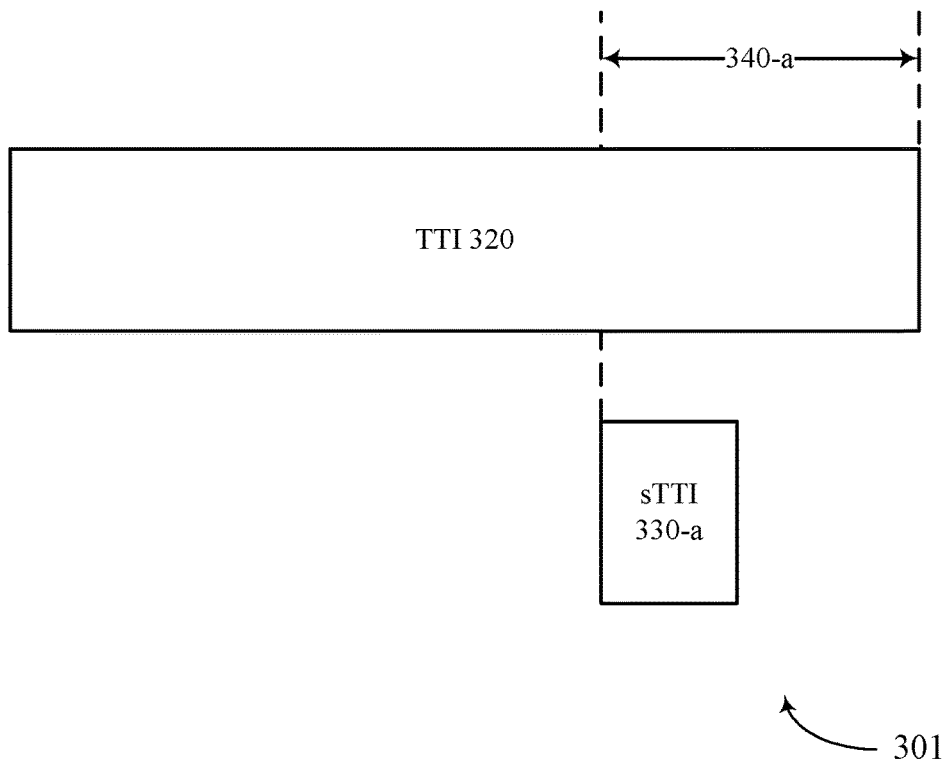
FIGS. 3A and 3B illustrate an example of a dropping scheme in a system that supports power reservation and dropping rules for TTIs in accordance with aspects of the present disclosure.
Figure 3B:
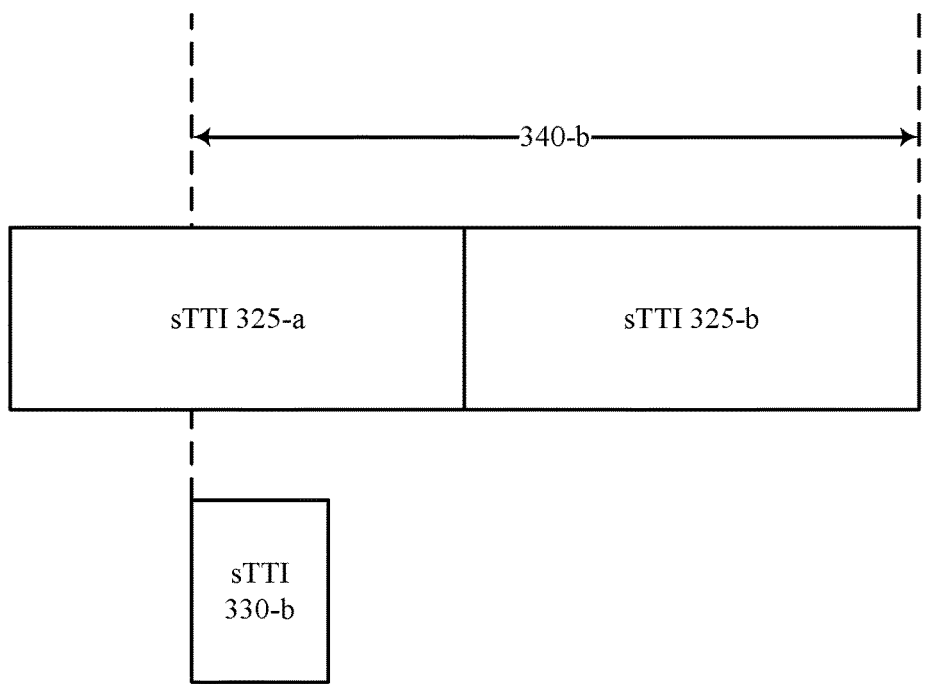

FIGS. 3A and 3B illustrate examples of a dropping scheme 301 and 302 in a system that supports power reservation and dropping rules for TTIs in accordance with various aspects of the present disclosure. In some examples, dropping scheme 301 and 302 may implement aspects of wireless communications systems 100 and 200. Dropping scheme 301 and 302 may illustrate techniques by which a UE 115 may prioritize different TTI lengths in case of a conflict when TTIs of different lengths are scheduled for transmission at a same time. A base station 105 may transmit an indication of dropping scheme 301 and 302 to the UE 115, for example, within power reservation information sent to the UE 115. In some cases, the UE 115 may determine and utilize dropping schemes 301 and/or 302 based on different configured TTI durations and/or PUCCH groups.

As shown in FIG. 3A, the UE 115 may be scheduled to transmit a TTI 320 and an sTTI 330-a at the same time. TTI 320 may correspond to a TTI 220 as described with reference to FIG. 2 (e.g., including multiple slots, or seven symbol sTTIs) comprising a subframe or a 1 ms TTI, and sTTIs 330-a may correspond to an sTTI 230-a as described with reference to FIG. 2 (e.g., a two-symbol or three-symbol TTI). In some examples, the base station 105 may indicate to the UE 115 to prioritize TTIs having a relatively shorter duration in a set of dropping rules (i.e., corresponding to dropping scheme 301) or the UE 115 independently may determine the set of dropping rules to apply. In accordance with dropping scheme 301, a portion of TTI 320 and sTTI 330-a may be scheduled for transmission at the same time. Upon identifying the collision, the UE 115 may prioritize sTTI 330-a and allocate power to transmit sTTI 330-a (e.g., based on TTI length), while dropping a remainder of the symbols in TTI 320 for a time 340-a. In other example, priority may be given to TTIs having longer durations, or the priority rules may be based on a content of the TTI, as described above.

As shown in FIG. 3B, different sTTIs may collide with each other at different times. For example, dropping scheme 302 may illustrate multiple sTTIs 325-a and 325-b that are scheduled to be transmitted at the same time as sTTI 330-b. In such cases, sTTIs 325-a and 325-b may correspond to the seven symbol sTTIs 230-b described with reference to FIG. 2. Upon identifying the collision, the UE 115 may prioritize sTTI 330-b, while dropping the remaining OFDM symbols of sTTI 325-a for a time 340-b, which may be based on a duration of sTTI 330-b. As with the dropping rules described above, the UE 115 may prioritize and allocate more power to the shorter sTTI (e.g., two symbol sTTI 330-b) and drop the longer sTTI (e.g., seven symbol sTTI 325-a). Additionally, if TTIs of a same length collide, the UE 115 may assign priority and more power allocation to one of the TTIs and drop the rest (e.g., drop a whole TTI or a remaining number of symbol periods). The dropping rules may be applied to inter-band, intra-band contiguous, intra-band non-contiguous CA cases, and the like.

Figure 4:
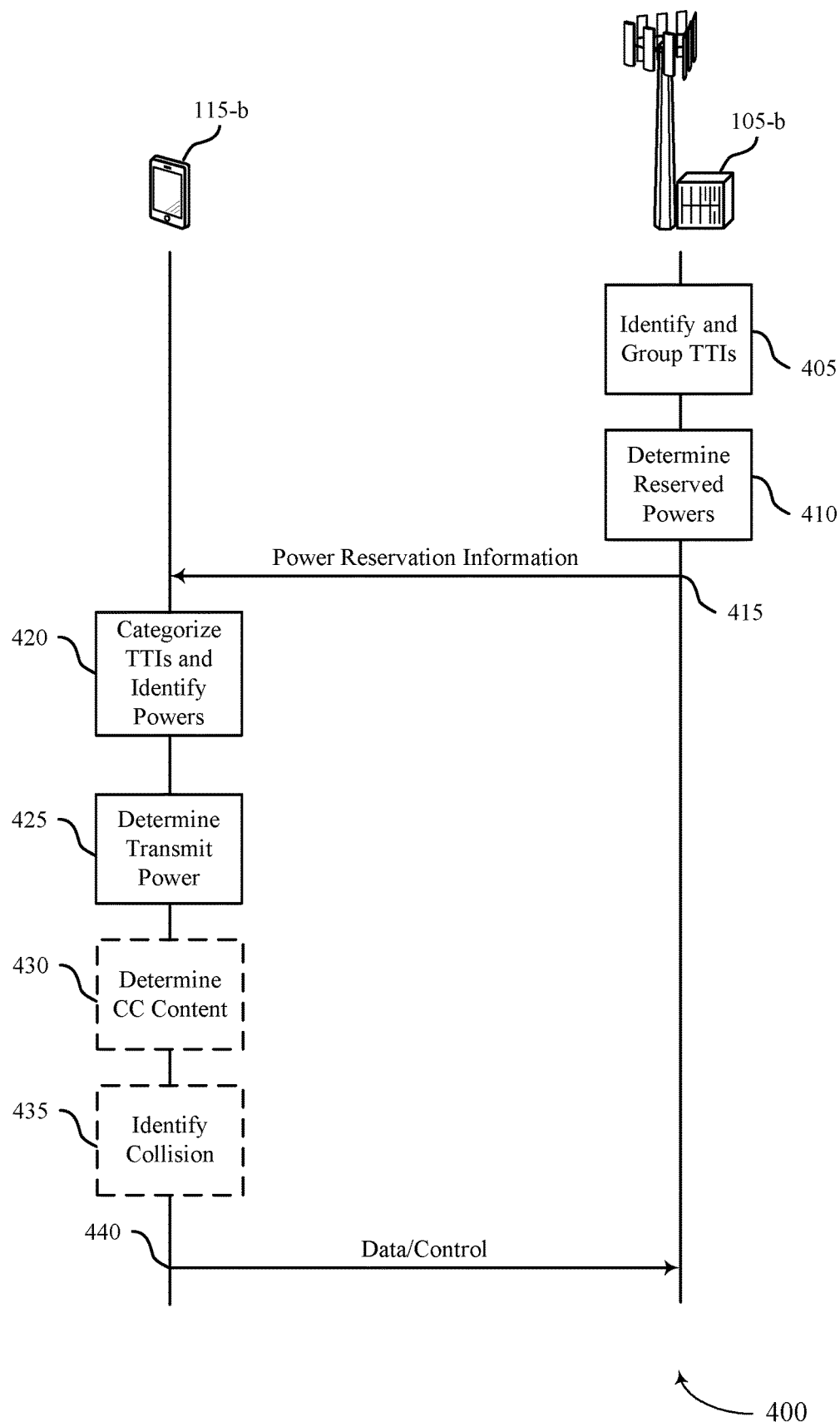
FIG. 4 illustrates an example of a process flow in a system that supports power reservation and dropping rules for TTIs in accordance with aspects of the present disclosure.

FIG. 4 illustrates an example of a process flow 400 that supports power reservation and dropping rules for transmission time intervals in accordance with various aspects of the present disclosure. In some examples, process flow 400 may implement aspects of wireless communications systems 100 and 200. Process flow 400 illustrates aspects of techniques performed by a base station 105-b and a UE 115-b, which may be examples of a base station 105 and a UE 115 as described with reference to FIGS. 1-3.

In the following description of the process flow 400, the operations between the UE 115-b and base station 105-b may be performed in different orders or at different times. Certain operations may also be left out of the process flow 400, or other operations may be added to the process flow 400.

At 405, base station 105-b may identify TTIs of a set of CCs of a CA mode. Base station 105-b may then categorize, by TTI duration (i.e., TTI length), the TTIs of the set of CCs into respective groups of TTIs. Additionally or alternatively, base station 105-b may identify a set of CCs of a CA mode, respective CCs of the set of CCs being associated with a first PUCCH group or a second PUCCH group.

At 410, base station 105-b may determine a reserved power for each respective group of TTIs of the CCs based on the TTI duration. Additionally, base station 105-b may determine an additional reserved power to use by UE 115-b when calculating a maximum transmit power limit, where a sum of the sum of the reserved powers and the additional reserved power is less than or equal to the maximum transmit power limit. Additionally or alternatively, base station 105-b may determine a reserved power for each of the first PUCCH group and the second PUCCH group.

At 415, base station 105-b may transmit, to UE 115-b, power reservation information that indicates the reserved power for each respective group of TTIs. Additionally or alternatively, the power reservation information may indicate the reserved power for each of the first PUCCH group and the second PUCCH group. Base station 105-b may transmit the power reservation information to UE 115-b via semi-static signaling or via a transmit power control command. The semi-static signaling may include RRC messaging. Additionally, UE 115-b may identify a reserved power for each respective group of TTIs of the set of CCs based on the received power reservation information. At 420, UE 115-b may categorize, by TTI duration (i.e., TTI length or number of symbol periods of the TTI), the TTIs of the set of CCs into respective groups of TTIs.

At 425, UE 115-b may determine the maximum transmit power limit based on a sum of the reserved powers. Additionally or alternatively, UE 115-b may determine the maximum transmit power limit based on a sum of the reserved powers for each respective group (i.e., a first PUCCH group and a second PUCCH group) of TTIs. In some cases, determining the maximum transmit power may include determining a total transmit power based on the sum of the reserved powers and identifying an additional reserved power indicated by the power reservation information, where a sum of the total transmit power and the additional reserved power is less than or equal to the maximum transmit power limit. In some cases, UE 115-*b* may allocate the additional reserved power to a first TTI group of the respective groups of TTIs based on a TTI priority, where a total power of the first TTI group is greater than a reserved power of the first TTI group. The TTIs of the first TTI group may have a first TTI duration that is shorter than a second TTI duration of another TTI. Additionally or alternatively, UE 115-*b* may allocate the additional reserved power to a first TTI group of the respective groups of TTIs, a reserved power of the first TTI group being exceeded before other respective groups of TTIs exceed respective reserved powers, where a total power of the first TTI group is greater than the reserved power of the first TTI group.

At 430, UE 115-*b* may determine a content to be transmitted on each CC of the set of CCs and during each respective group of TTIs. UE 115-*b* may further scale a transmit power for each respective group of TTIs based on a priority of the content. Additionally, UE 115-*b* may identify two of more CCs of the set of CCs that transmit a same content using a same TTI duration and may scale the transmit power for the two or more CCs based on a priority of the content. The content may include a PUCCH, or PUSCH including UCI, or a PUSCH that does not include UCI, or a SRS (e.g., reference signal).

At 435, UE 115-*b* may identify a collision between a first TTI having a first duration and a second TTI having a second duration to be transmitted on the set of CCs, the second duration being less than the first duration. UE 115-*b* may determine a priority of the first TTI and the second TTI. Additionally, UE 115-*b* may drop one or more symbol periods of the first TTI or the second TTI having a lowest priority based on the determined priority and may allocate a reserved power to the first TTI or the second TTI having a highest priority based on the determined priority. At 440, UE 115-*b* may transmit uplink signals during the TTIs of the set of CCs using a transmit power that is less than the determined maximum transmit power limit. For example, the uplink signals may include uplink control or data, or reference signals such as an SRS.

Figure 5:
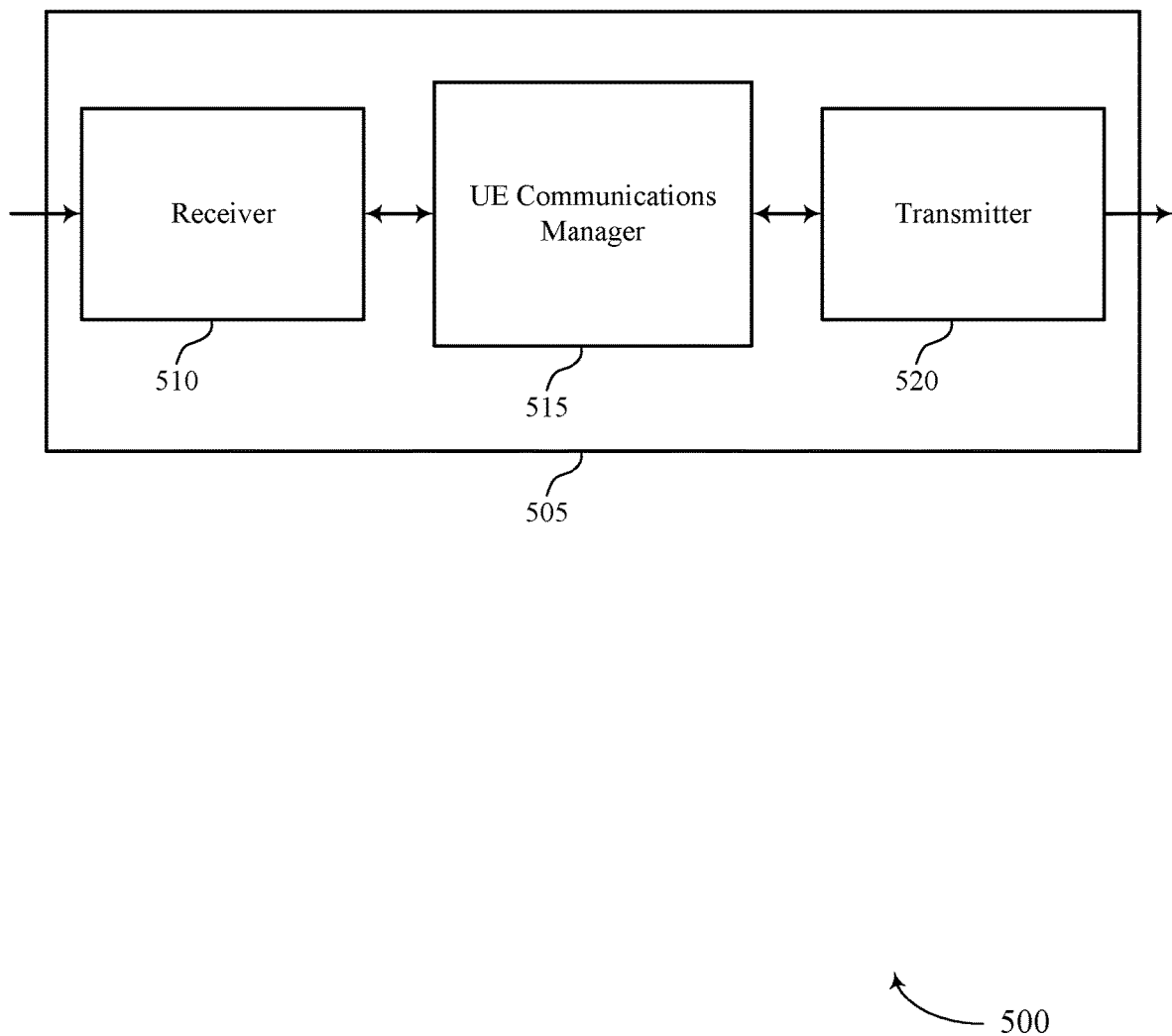
FIGS. 5 through 7 show block diagrams of a device that supports power reservation and dropping rules for TTIs in accordance with aspects of the present disclosure.

FIG. 5 shows a block diagram 500 of a wireless device 505 that supports power reservation and dropping rules for TTIs in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to power reservation and dropping rules for TTIs, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, from a base station, power reservation information for TTIs to be used with a set of CCs of a CA mode, and may categorize, by TTI duration, the TTIs of the set of CCs into respective groups of TTIs. In some examples, UE communications manager 515 may identify a reserved power for each respective group of TTIs of the set of CCs based on the received power reservation information and determine a maximum transmit power limit based on a sum of the reserved powers. UE communications manager 515 may transmit during the TTIs of the set of CCs using a transmit power that is less than the determined maximum transmit power limit.

Additionally or alternatively, UE communications manager 515 may receive, from a base station, power reservation information for a set of CCs of a CA mode, respective CCs of the set of CCs associated with a first PUCCH group or a second PUCCH group. UE communications manager 515 may identify a reserved power for each of the first PUCCH group and the second PUCCH group based on the received power reservation information, determine a maximum transmit power limit based on a sum of the reserved powers, and transmit on the set of CCs using a transmit power that is less than or equal to the determined maximum transmit power limit.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
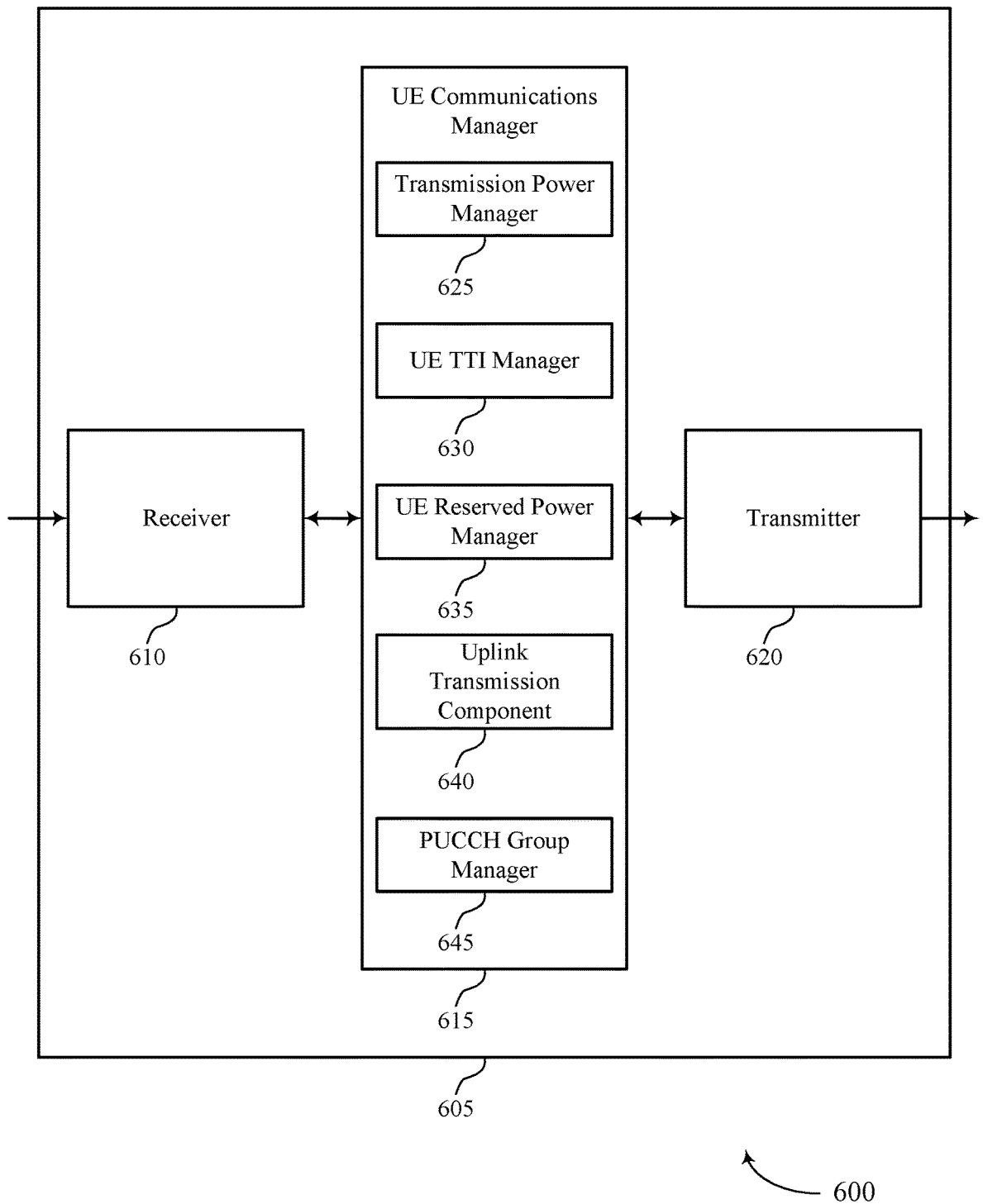

FIG. 6 shows a block diagram 600 of a wireless device 605 that supports power reservation and dropping rules for TTIs in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to power reservation and dropping rules for TTIs, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include transmission power manager 625, UE TTI manager 630, UE reserved power manager 635, uplink transmission component 640, and PUCCH group manager 645.

Transmission power manager 625 may receive, from a base station 105, power reservation information for TTIs to be used with a set of CCs of a CA mode and determine a maximum transmit power limit based on a sum of the reserved powers. Additionally or alternatively, transmission power manager 625 may receive, from the base station 105, power reservation information for a set of CCs of a CA mode, respective CCs of the set of CCs associated with a first PUCCH group or a second PUCCH group. In some examples, transmission power manager 625 may determine a maximum transmit power limit based on a sum of the reserved powers for each respective group of TTIs. In some aspects, transmission power manager 625 may receive the power reservation information via semi-static signaling from the base station or via a transmit power control command from the base station.

In some examples, transmission power manager 625 may scale a transmit power for CCs or for TTIs, or both, based on various factors. For instance, transmission power manager 625 may scale the transmit power for the two or more CCs based on a priority of the content, or may scale a transmit power of the first PUCCH group or the second PUCCH group based on a priority of the content and a TTI duration. In other examples, transmission power manager 625 may scale a transmit power for each respective group of TTIs based on a priority of the content. In some cases, the semi-static signaling includes RRC messaging. In some cases, determining the maximum transmit power limit includes: determining a total transmit power based on the sum of the reserved powers.

UE TTI manager 630 may categorize, by TTI duration, the TTIs of the set of CCs into respective groups of TTIs. In some examples, UE TTI manager 630 may identify a collision between a first TTI having a first duration and a second TTI having a second duration to be transmitted on the set of CCs, the second duration being less than the first duration. UE reserved power manager 635 may identify a reserved power for each respective group of TTIs of the set of CCs based on the received power reservation information. In some examples, UE reserved power manager 635 may receive, within the power reservation information, an indication of reserved powers for respective groups of TTIs to be used with the first PUCCH group and the second PUCCH group.

Uplink transmission component 640 may transmit during the TTIs of the set of CCs using a transmit power that is less than the determined maximum transmit power limit and transmit on the set of CCs using a transmit power that is less than or equal to the determined maximum transmit power limit. PUCCH group manager 645 may identify a reserved power for each of the first PUCCH group and the second PUCCH group based on the received power reservation information.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
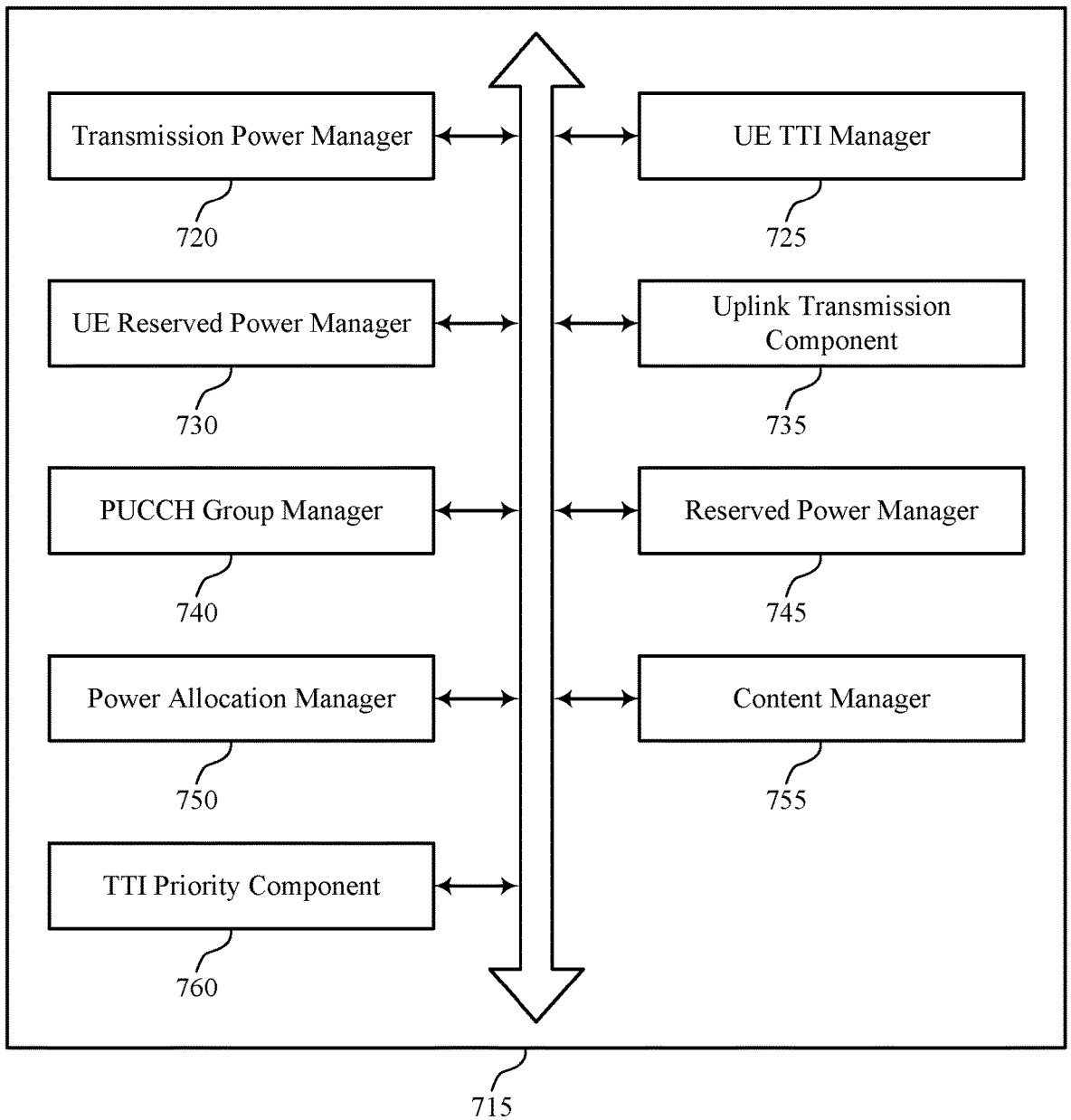

FIG. 7 shows a block diagram 700 of a UE communications manager 715 that supports power reservation and dropping rules for TTIs in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include transmission power manager 720, UE TTI manager 725, UE reserved power manager 730, uplink transmission component 735, PUCCH group manager 740, reserved power manager 745, power allocation manager 750, content manager 755, and TTI priority component 760. Each of these modules may communicate, directly or indirectly, with one another (e.g., via one or more buses).

Transmission power manager 720 may receive, from a base station 105, power reservation information for TTIs to be used with a set of CCs of a CA mode and determine a maximum transmit power limit based on a sum of the reserved powers. Additionally or alternatively, transmission power manager 720 may receive, from the base station 105, power reservation information for a set of CCs of a CA mode, respective CCs of the set of CCs associated with a first PUCCH group or a second PUCCH group. In some examples, transmission power manager 720 may determine a maximum transmit power limit based on a sum of the reserved powers for each respective group of TTIs. In some aspects, transmission power manager 720 may receive the power reservation information via semi-static signaling from the base station or via a transmit power control command from the base station.

In some examples, transmission power manager 720 may scale a transmit power for CCs or for TTIs, or both, based on various factors. For instance, transmission power manager 720 may scale the transmit power for the two or more CCs based on a priority of the content, or may scale a transmit power of the first PUCCH group or the second PUCCH group based on a priority of the content and a TTI duration. In other examples, transmission power manager 720 may scale a transmit power for each respective group of TTIs based on a priority of the content. In some cases, the semi-static signaling includes RRC messaging. In some cases, determining the maximum transmit power limit includes: determining a total transmit power based on the sum of the reserved powers.

UE TTI manager 725 may categorize, by TTI duration, the TTIs of the set of CCs into respective groups of TTIs. In some examples, UE TTI manager 725 may identify a collision between a first TTI having a first duration and a second TTI having a second duration to be transmitted on the set of CCs, the second duration being less than the first duration. UE reserved power manager 730 may identify a reserved power for each respective group of TTIs of the set of CCs based on the received power reservation information and receive, within the power reservation information, an indication of reserved powers for respective groups of TTIs to be used with the first PUCCH group and the second PUCCH group.

Uplink transmission component 735 may transmit during the TTIs of the set of CCs using a transmit power that is less than the determined maximum transmit power limit and transmit on the set of CCs using a transmit power that is less than or equal to the determined maximum transmit power limit. PUCCH group manager 740 may identify a reserved power for each of the first PUCCH group and the second PUCCH group based on the received power reservation information.

Reserved power manager 745 may identify an additional reserved power indicated by the power reservation information, where a sum of the total transmit power and the additional reserved power is less than or equal to the maximum transmit power limit. Power allocation manager 750 may, in some cases, allocate the additional reserved power to a first TTI group of the respective groups of TTIs based on a TTI priority, where a total power of the first TTI group is greater than a reserved power of the first TTI group. Additionally or alternatively, power allocation manager 750 may allocate the additional reserved power to a first TTI group of the respective groups of TTIs, a reserved power of the first TTI group being exceeded before other respective groups of TTIs exceed other respective reserved powers, where a total power of the first TTI group is greater than the reserved power of the first TTI group. In some examples, power allocation manager 750 may allocate a reserved power to the first TTI or the second TTI having a highest priority based on the determined priority. In some cases, the TTIs of the first TTI group have a first TTI duration that is shorter than a second TTI duration of another TTI.

Content manager 755 may determine a content to be transmitted on each CC of the set of CCs and during each respective group of TTIs. In some examples, content manager 755 may identify two of more CCs of the set of CCs that transmit a same content using a same TTI duration, and determine a content to be transmitted for the first PUCCH group and the second PUCCH group and during each respective group of TTIs. In some cases, the content includes a PUCCH, or a PUSCH including UCI, or a PUSCH that does not include UCI, or an SRS. TTI priority component 760 may determine a priority of the first TTI and the second TTI and drop one or more symbol periods of the first TTI or the second TTI having a lowest priority based on the determined priority.

In some cases, TTI priority component 760 may drop a transmission based on content or length of a first TTI of the TTIs. Accordingly, in some examples, dropping the transmission is based on the length of the first TTI, and where the length of the first TTI is a subframe or a slot. Additionally or alternatively, TTI priority component 760 may drop at least a portion of a first TTI of the TTIs based on at least one dropping rule. In some examples, TTI priority component 760 may drop at least a portion of a first TTI of the TTIs based on a duration of the first TTI.

Additionally, in some cases, content manager 755 may drop the transmission based on the content of the first TTI, and where the content of the first TTI includes a PUCCH, or a PUSCH with UCI, or a PUSCH without UCI, or a reference signal. In some examples, content manager 755 may drop at least a portion of a first TTI of the TTIs based on a priority of content scheduled to be transmitted in the first TTI. Additionally or alternatively, content manager 755 may determine first content of a first control channel group scheduled to be transmitted during a first TTI of the TTIs and second content of a second control channel group scheduled to be transmitted during a second TTI of the TTIs. In some cases, the content manager 755 may drop at least a portion of the first TTI or the second TTI based on a priority of the first content and a priority of the second content. In some examples, dropping at least a portion of a first TTI of the TTIs may be based on whether content scheduled to be transmitted in the first TTI includes uplink control information. Additionally or alternatively, the content manager 755 may drop at least a portion of a first TTI of the TTIs based on whether a signal scheduled to be transmitted within the first TTI is a reference signal.

Power allocation manager 750 may allocate the transmit power based on the dropping the transmission or at least a portion of a first TTI as described above.

Figure 8:
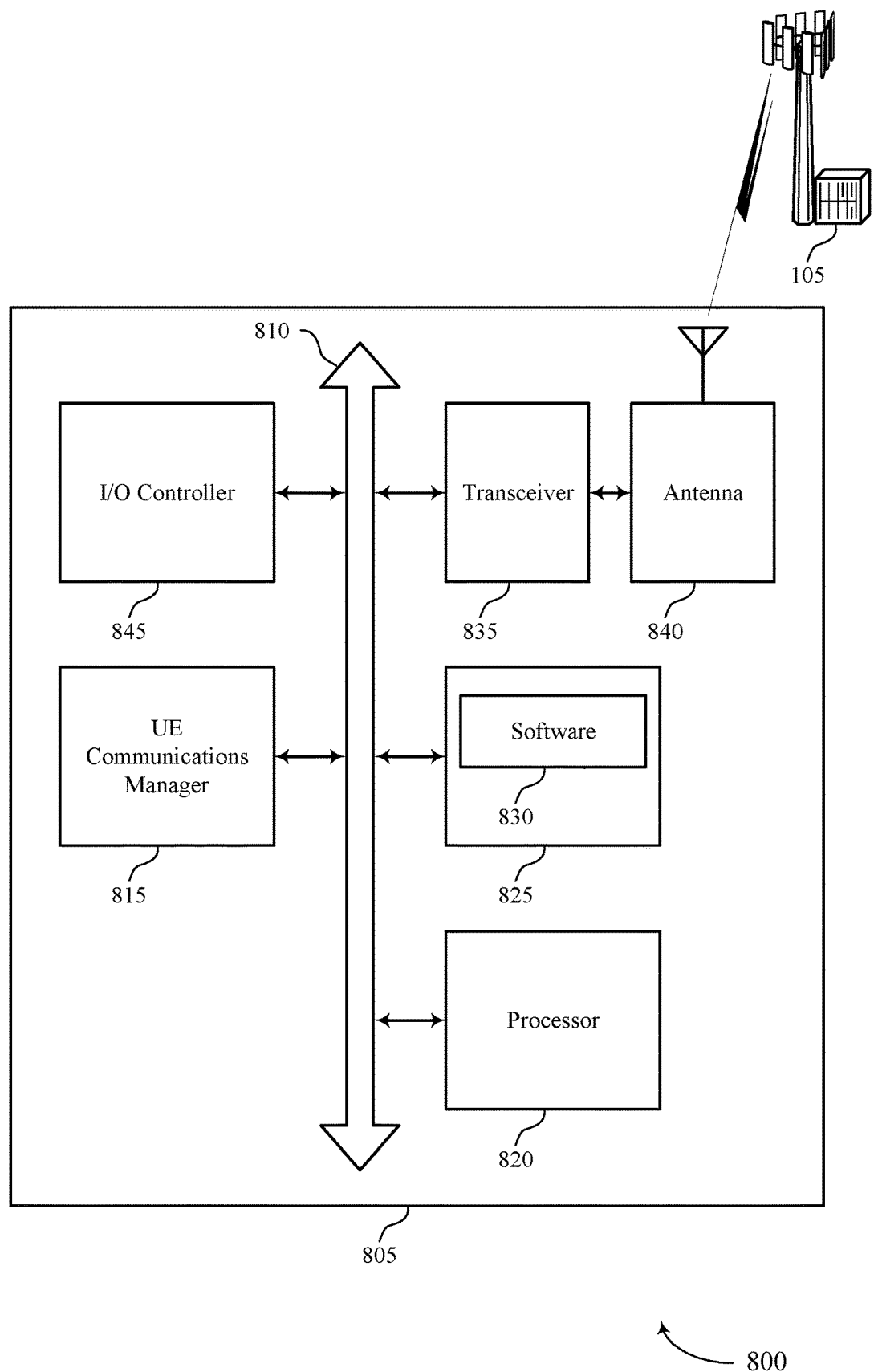
FIG. 8 illustrates a block diagram of a system including a user equipment (UE) that supports power reservation and dropping rules for TTIs in accordance with aspects of the present disclosure.

FIG. 8 shows a diagram of a system 800 including a device 805 that supports power reservation and dropping rules for TTIs in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting power reservation and dropping rules for TTIs).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support power reservation and dropping rules for TTIs. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
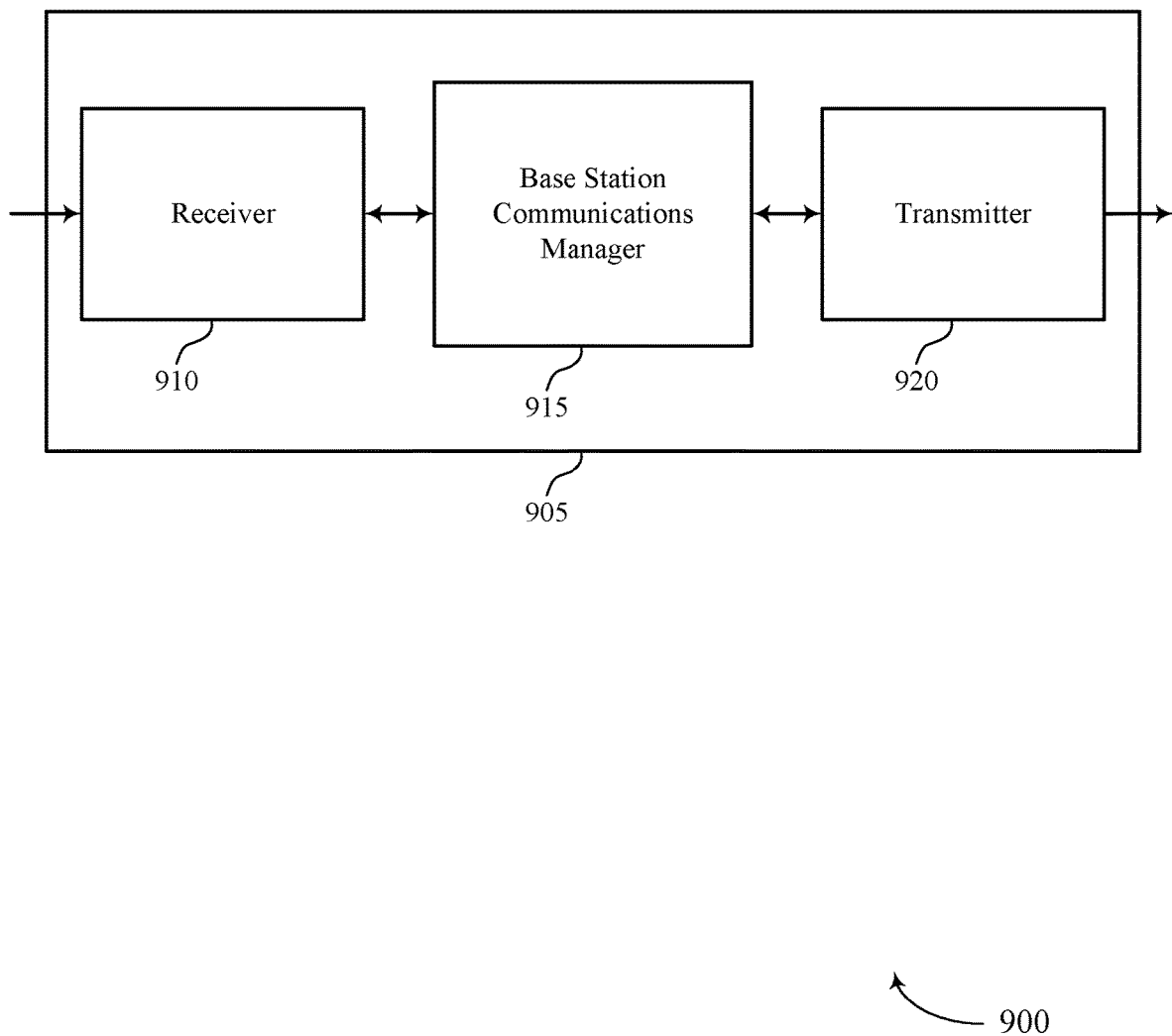
FIGS. 9 through 11 show block diagrams of a device that supports power reservation and dropping rules for TTIs in accordance with aspects of the present disclosure.

FIG. 9 shows a block diagram 900 of a wireless device 905 that supports power reservation and dropping rules for TTIs in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to power reservation and dropping rules for TTIs, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify TTIs of a set of CCs of a CA mode, categorize, by TTI duration, the TTIs of the set of CCs into respective groups of TTIs, determine a reserved power for each respective group of TTIs of the set of CCs based on the TTI duration, and transmit, to a UE, power reservation information that indicates the reserved power for each respective group of TTIs.

Additionally or alternatively, base station communications manager 915 may identify a set of CCs of a CA mode, respective CCs of the set of CCs being associated with a first PUCCH group or a second PUCCH group. In such cases, base station communications manager 915 may determine a reserved power for each of the first PUCCH group and the second PUCCH group, and transmit, to a UE 115, power reservation information that indicates the reserved power for each of the first PUCCH group and the second PUCCH group.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
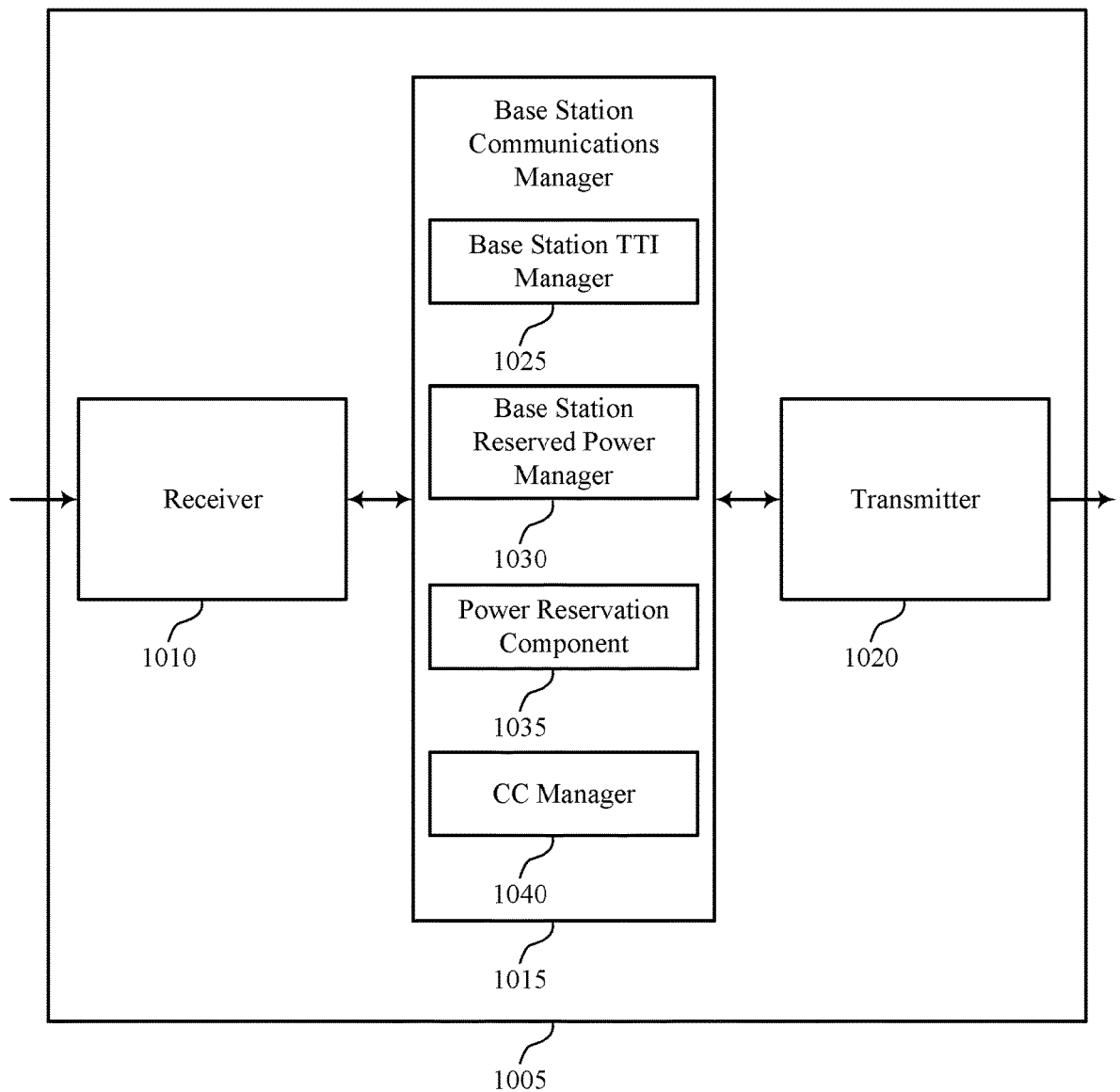

FIG. 10 shows a block diagram 1000 of a wireless device 1005 that supports power reservation and dropping rules for TTIs in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power reservation and dropping rules for TTIs, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include base station TTI manager 1025, base station reserved power manager 1030, power reservation component 1035, and CC manager 1040.

Base station TTI manager 1025 may identify TTIs of a set of CCs of a CA mode and categorize, by TTI duration, the TTIs of the set of CCs into respective groups of TTIs. Base station reserved power manager 1030 may determine a reserved power for each respective group of TTIs of the set of CCs based on the TTI duration. In some examples, base station reserved power manager 1030 may determine an additional reserved power to use by a UE 115 when calculating a maximum transmit power limit, where a sum of the reserved powers and the additional reserved power is less than or equal to the maximum transmit power limit. In some cases, base station reserved power manager 1030 may determine a reserved power for each of a first PUCCH group and a second PUCCH group.

Power reservation component 1035 may transmit, to the UE 115, power reservation information that indicates the reserved power for each respective group of TTIs. Power reservation component 1035 may also transmit the power reservation information to the UE 115 via semi-static signaling or via a transmit power control command. In some cases, power reservation component 1035 may transmit an indication of the additional reserved power in the power reservation information, and transmit, to the UE 115, power reservation information that indicates the reserved power for each of the first PUCCH group and the second PUCCH group. In some cases, the semi-static signaling includes RRC messaging. CC manager 1040 may identify a set of CCs of a CA mode, respective CCs of the set of CCs being associated with a first PUCCH group or a second PUCCH group.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
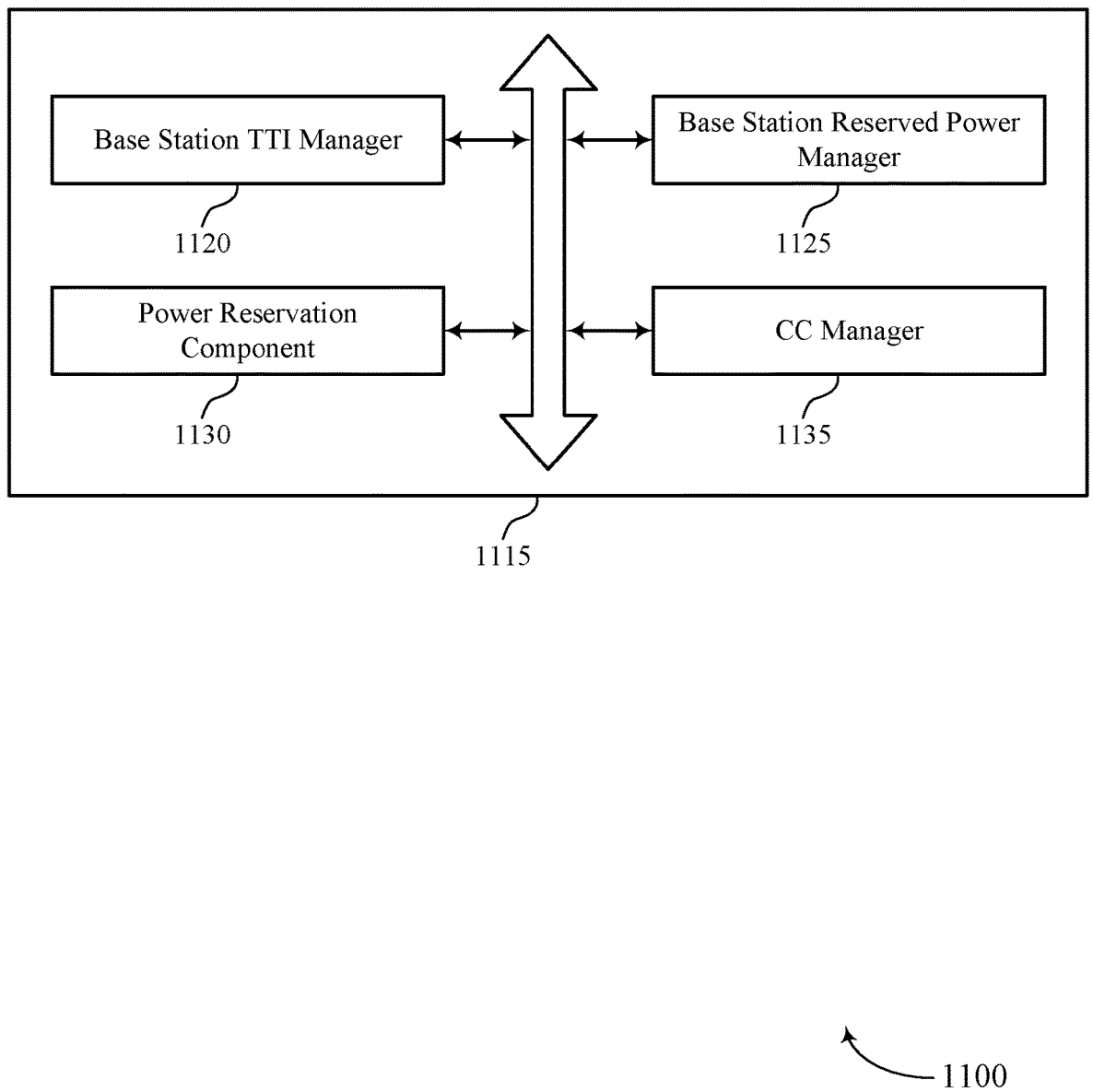

FIG. 11 shows a block diagram 1100 of a base station communications manager 1115 that supports power reservation and dropping rules for TTIs in accordance with aspects of the present disclosure. The base station communications manager 1115 may be an example of aspects of a base station communications manager 1215 described with reference to FIGS. 9, 10, and 12. The base station communications manager 1115 may include base station TTI manager 1120, base station reserved power manager 1125, power reservation component 1130, and CC manager 1135. Each of these modules may communicate, directly or indirectly, with one another (e.g., via one or more buses).

Base station TTI manager 1120 may identify TTIs of a set of CCs of a CA mode and categorize, by TTI duration, the TTIs of the set of CCs into respective groups of TTIs. Base station reserved power manager 1125 may determine a reserved power for each respective group of TTIs of the set of CCs based on the TTI duration. In some examples, base station reserved power manager 1125 may determine an additional reserved power to use by a UE 115 when calculating a maximum transmit power limit, where a sum of the reserved powers and the additional reserved power is less than or equal to the maximum transmit power limit. In some cases, base station reserved power manager 1125 may determine a reserved power for each of a first PUCCH group and a second PUCCH group.

Power reservation component 1130 may transmit, to the UE 115, power reservation information that indicates the reserved power for each respective group of TTIs. Power reservation component 1130 may also transmit the power reservation information to the UE 115 via semi-static signaling or via a transmit power control command. In some cases, power reservation component 1130 may transmit an indication of the additional reserved power in the power reservation information, and transmit, to the UE 115, power reservation information that indicates the reserved power for each of the first PUCCH group and the second PUCCH group. In some cases, the semi-static signaling includes RRC messaging. CC manager 1135 may identify a set of CCs of a CA mode, respective CCs of the set of CCs being associated with a first PUCCH group or a second PUCCH group.

Figure 12:
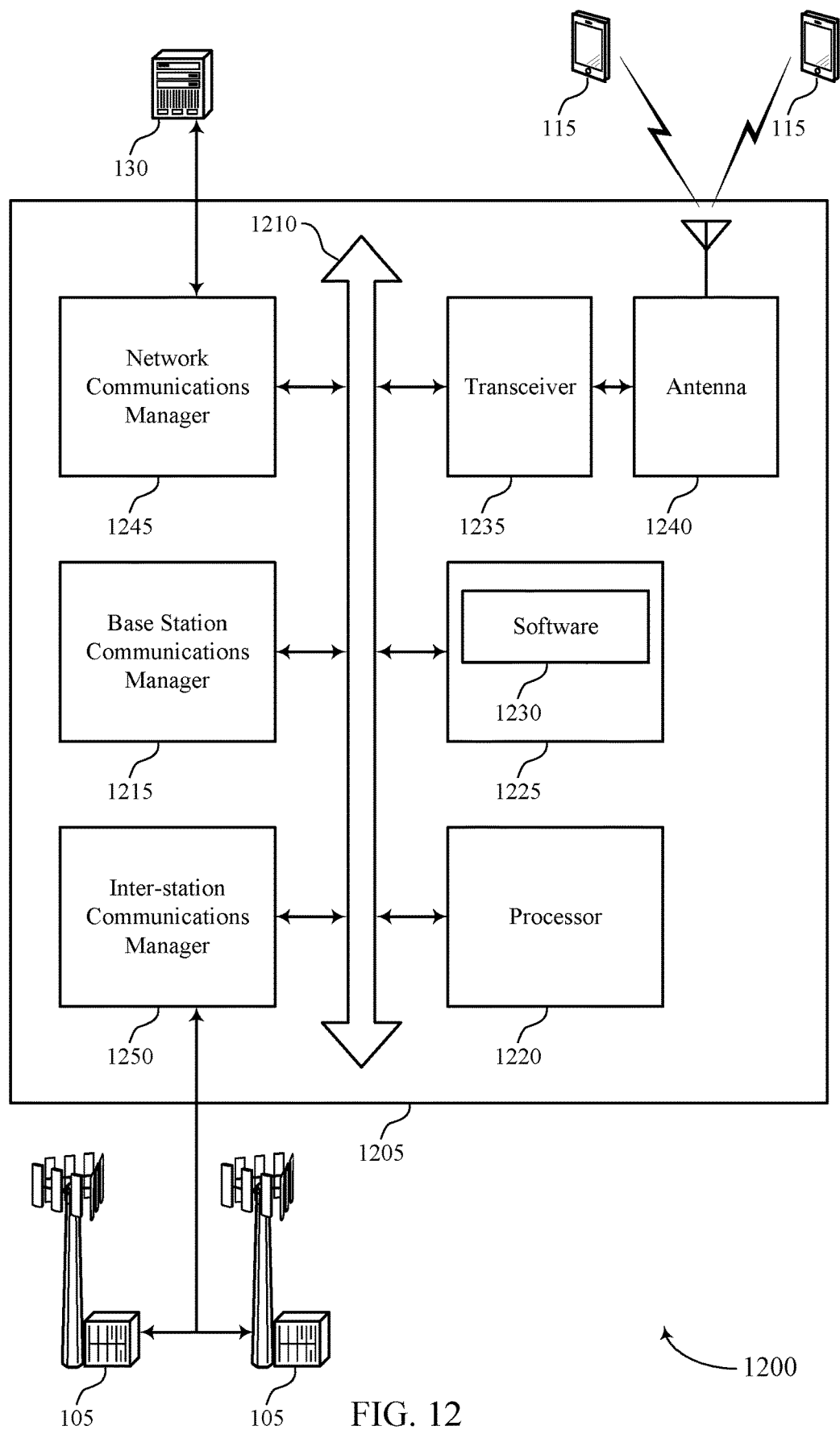
FIG. 12 illustrates a block diagram of a system including a base station that supports power reservation and dropping rules for TTIs in accordance with aspects of the present disclosure.

FIG. 12 shows a diagram of a system 1200 including a device 1205 that supports power reservation and dropping rules for TTIs in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting power reservation and dropping rules for TTIs).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support power reservation and dropping rules for TTIs. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
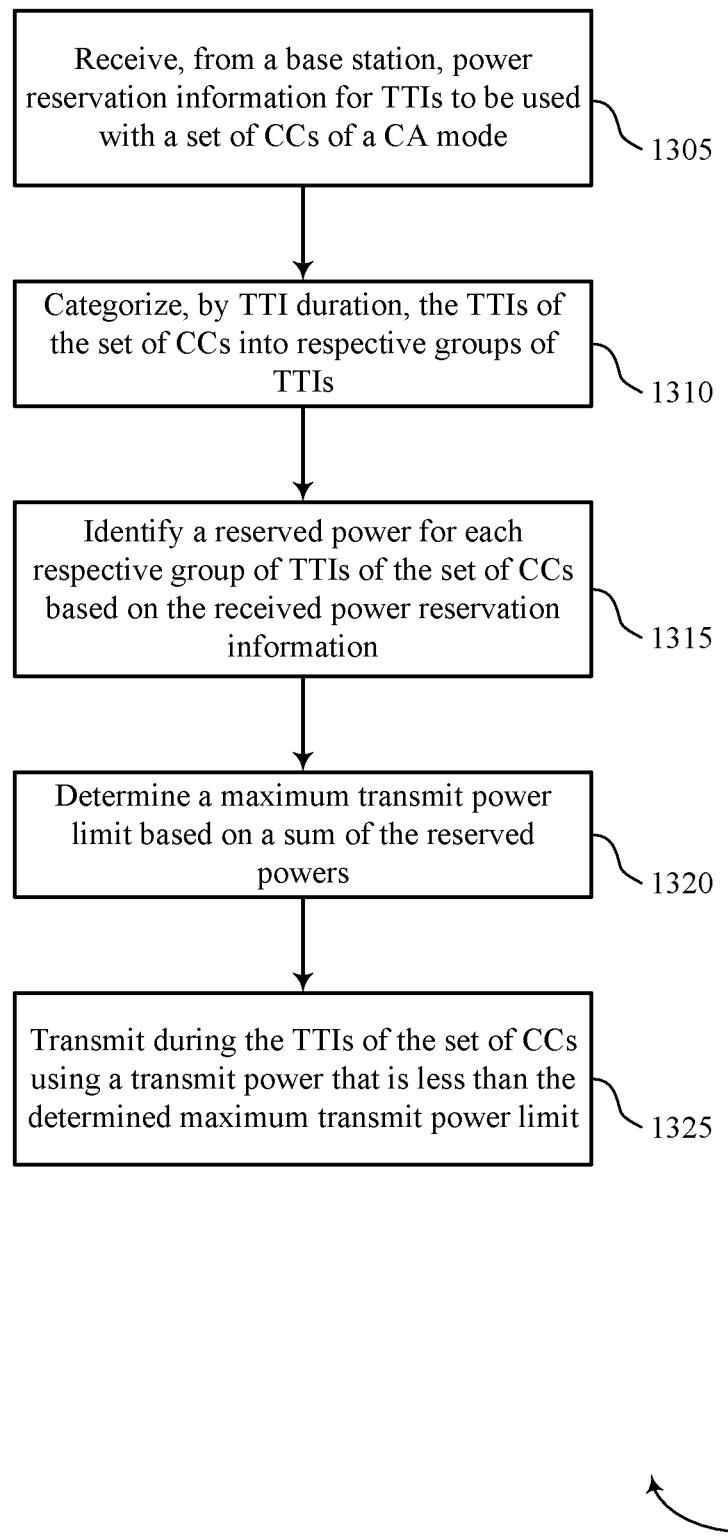
FIGS. 13 through 19 illustrate methods for power reservation and dropping rules for TTIs in accordance with aspects of the present disclosure.

FIG. 13 shows a flowchart illustrating a method 1300 for power reservation and dropping rules for TTIs in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station 105, power reservation information for TTIs to be used with a set of CCs of a CA mode. The operations of 1305 may be performed according to the methods described herein. In certain examples, aspects of the operations of 1305 may be performed by a transmission power manager as described with reference to FIGS. 5 through 8.

At 1310 the UE 115 may categorize, by TTI duration, the TTIs of the set of CCs into respective groups of TTIs. The operations of 1310 may be performed according to the methods described herein. In certain examples, aspects of the operations of 1310 may be performed by a UE TTI manager as described with reference to FIGS. 5 through 8.

At 1315 the UE 115 may identify a reserved power for each respective group of TTIs of the set of CCs based on the received power reservation information. The operations of 1315 may be performed according to the methods described herein. In certain examples, aspects of the operations of 1315 may be performed by a UE reserved power manager as described with reference to FIGS. 5 through 8.

At 1320 the UE 115 may determine a maximum transmit power limit based on a sum of the reserved powers. The operations of 1320 may be performed according to the methods described herein. In certain examples, aspects of the operations of 1320 may be performed by a transmission power manager as described with reference to FIGS. 5 through 8.

At 1325 the UE 115 may transmit during the TTIs of the set of CCs using a transmit power that is less than the determined maximum transmit power limit. The operations of 1325 may be performed according to the methods described herein. In certain examples, aspects of the operations of 1325 may be performed by a uplink transmission component as described with reference to FIGS. 5 through 8.

Figure 14:
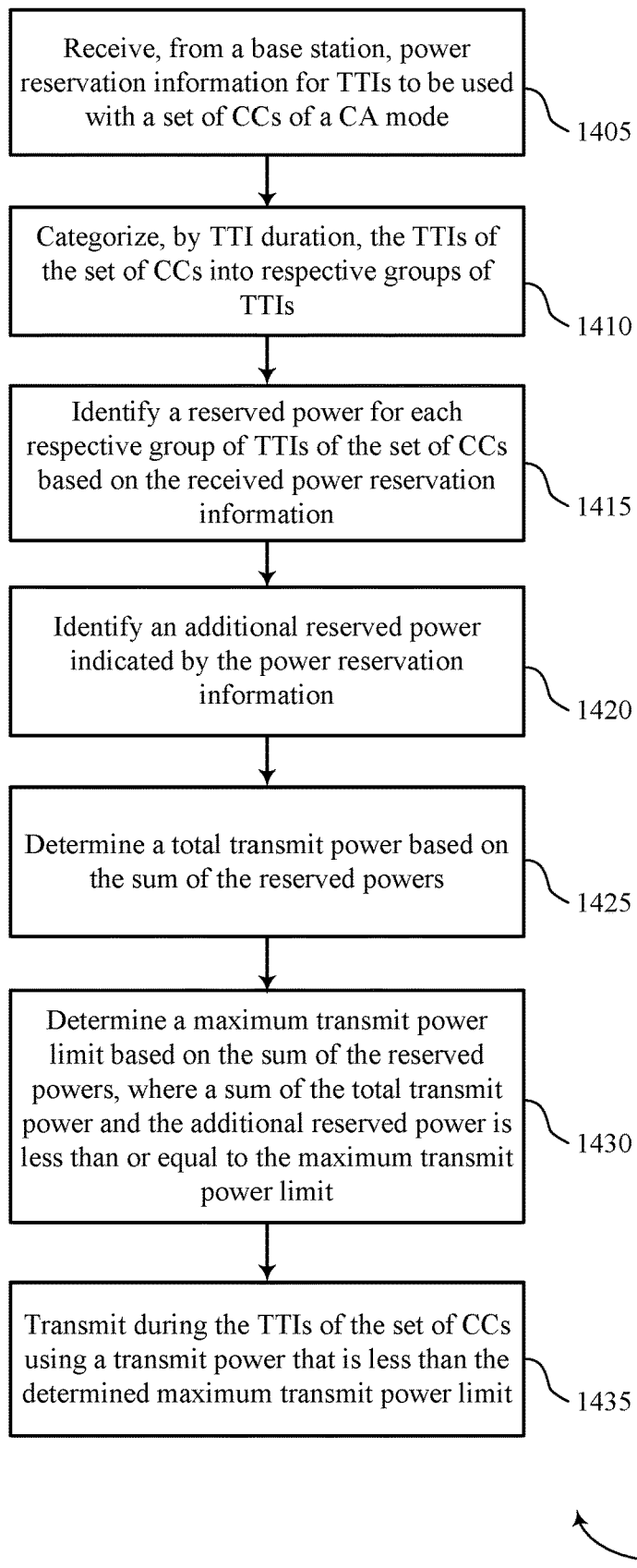

FIG. 14 shows a flowchart illustrating a method 1400 for power reservation and dropping rules for TTIs in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station 105, power reservation information for TTIs to be used with a set of CCs of a CA mode. The operations of 1405 may be performed according to the methods described herein. In certain examples, aspects of the operations of 1405 may be performed by a transmission power manager as described with reference to FIGS. 5 through 8.

At 1410 the UE 115 may categorize, by TTI duration, the TTIs of the set of CCs into respective groups of TTIs. The operations of 1410 may be performed according to the methods described herein. In certain examples, aspects of the operations of 1410 may be performed by a UE TTI manager as described with reference to FIGS. 5 through 8.

At 1415 the UE 115 may identify a reserved power for each respective group of TTIs of the set of CCs based on the received power reservation information. The operations of 1415 may be performed according to the methods described herein. In certain examples, aspects of the operations of 1415 may be performed by a UE reserved power manager as described with reference to FIGS. 5 through 8.

At 1420 the UE 115 may identify an additional reserved power indicated by the power reservation information. The operations of 1420 may be performed according to the methods described herein. In certain examples, aspects of the operations of 1420 may be performed by a reserved power manager as described with reference to FIGS. 5 through 8.

At 1425 the UE 115 may determine a total transmit power based on a sum of the reserved powers. The operations of 1425 may be performed according to the methods described herein. In certain examples, aspects of the operations of 1425 may be performed by a transmission power manager as described with reference to FIGS. 5 through 8.

At 1430 the UE 115 may determine a maximum transmit power limit based on the sum of the reserved powers, where a sum of the total transmit power and the additional reserved power is less than or equal to the maximum transmit power limit. The operations of 1430 may be performed according to the methods described herein. In certain examples, aspects of the operations of 1430 may be performed by a transmission power manager as described with reference to FIGS. 5 through 8.

At 1435 the UE 115 may transmit during the TTIs of the set of CCs using a transmit power that is less than the determined maximum transmit power limit. The operations of 1435 may be performed according to the methods described herein. In certain examples, aspects of the operations of 1435 may be performed by a uplink transmission component as described with reference to FIGS. 5 through 8.

Figure 15:
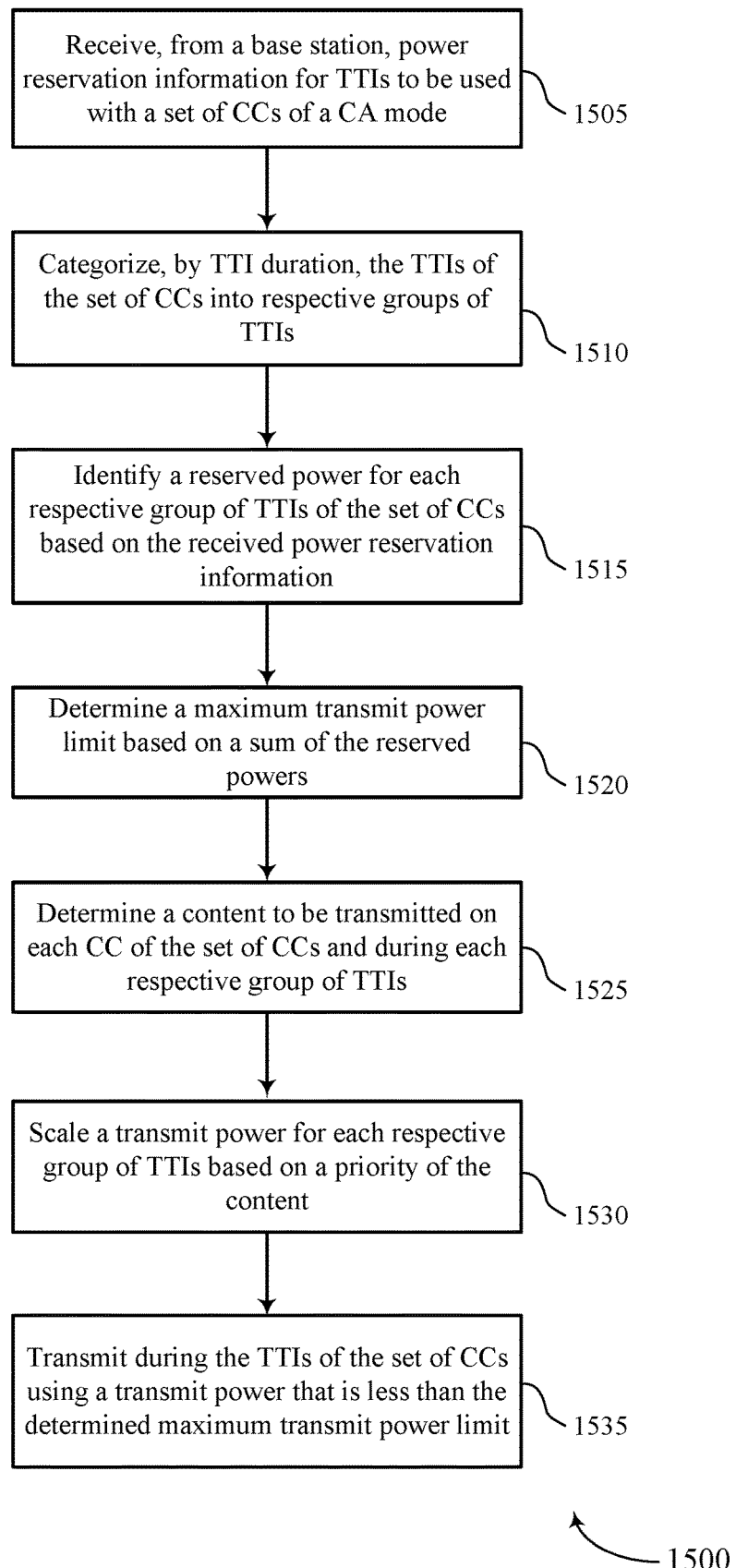

FIG. 15 shows a flowchart illustrating a method 1500 for power reservation and dropping rules for TTIs in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station 105, power reservation information for TTIs to be used with a set of CCs of a CA mode. The operations of 1505 may be performed according to the methods described herein. In certain examples, aspects of the operations of 1505 may be performed by a transmission power manager as described with reference to FIGS. 5 through 8.

At 1510 the UE 115 may categorize, by TTI duration, the TTIs of the set of CCs into respective groups of TTIs. The operations of 1510 may be performed according to the methods described herein. In certain examples, aspects of the operations of 1510 may be performed by a UE TTI manager as described with reference to FIGS. 5 through 8.

At 1515 the UE 115 may identify a reserved power for each respective group of TTIs of the set of CCs based on the received power reservation information. The operations of 1515 may be performed according to the methods described herein. In certain examples, aspects of the operations of 1515 may be performed by a UE reserved power manager as described with reference to FIGS. 5 through 8.

At 1520 the UE 115 may determine a maximum transmit power limit based on a sum of the reserved powers. The operations of 1520 may be performed according to the methods described herein. In certain examples, aspects of the operations of 1520 may be performed by a transmission power manager as described with reference to FIGS. 5 through 8.

At 1525 the UE 115 may determine a content to be transmitted on each CC of the set of CCs and during each respective group of TTIs. The operations of 1525 may be performed according to the methods described herein. In certain examples, aspects of the operations of 1525 may be performed by a content manager as described with reference to FIGS. 5 through 8.

At 1530 the UE 115 may scale a transmit power for each respective group of TTIs based on a priority of the content. The operations of 1530 may be performed according to the methods described herein. In certain examples, aspects of the operations of 1530 may be performed by a transmission power manager as described with reference to FIGS. 5 through 8.

At 1535 the UE 115 may transmit during the TTIs of the set of CCs using a transmit power that is less than the determined maximum transmit power limit. The operations of 1535 may be performed according to the methods described herein. In certain examples, aspects of the operations of 1535 may be performed by a uplink transmission component as described with reference to FIGS. 5 through 8.

Figure 16:
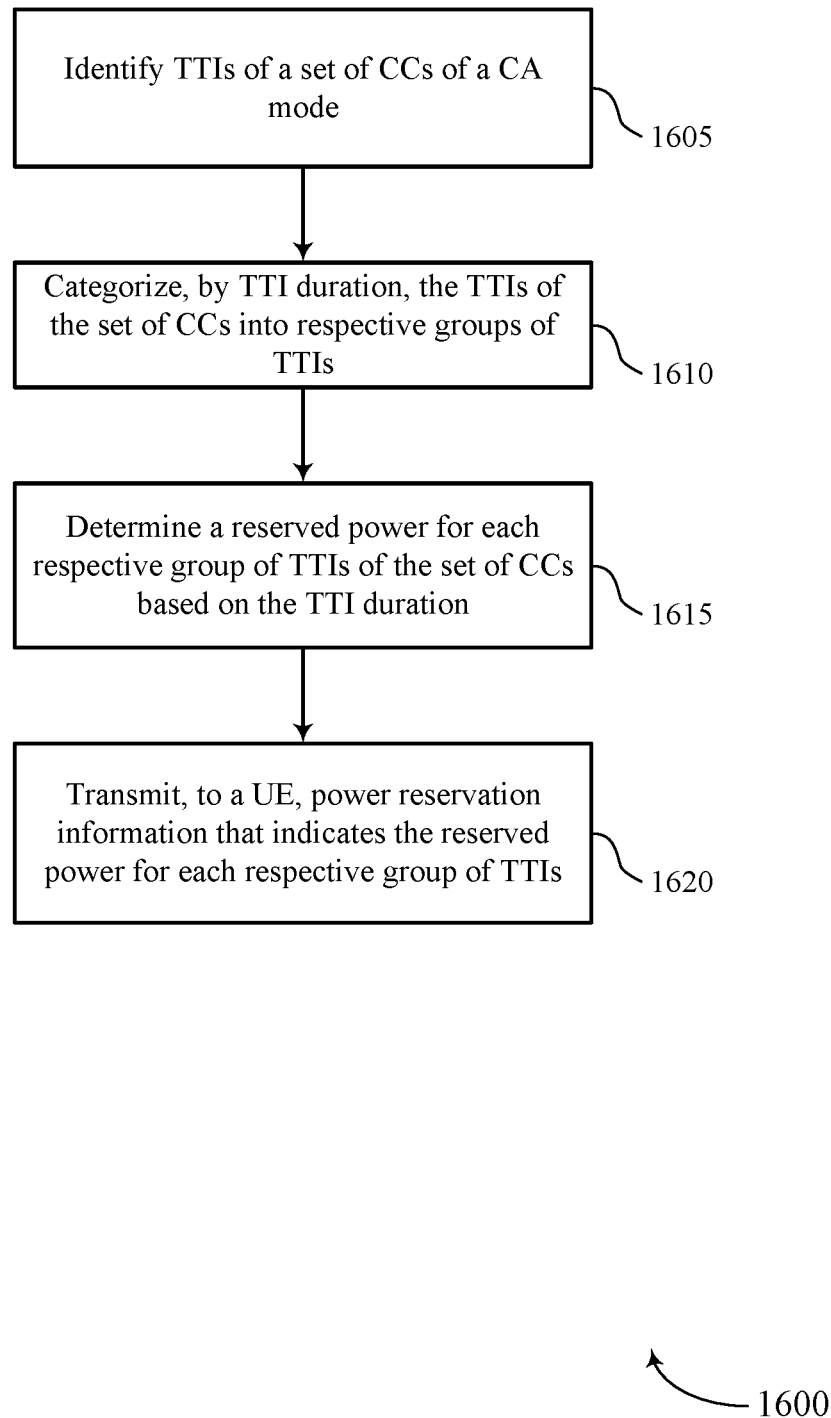

FIG. 16 shows a flowchart illustrating a method 1600 for power reservation and dropping rules for TTIs in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify TTIs of a set of CCs of a CA mode. The operations of 1605 may be performed according to the methods described herein. In certain examples, aspects of the operations of 1605 may be performed by a base station TTI manager as described with reference to FIGS. 9 through 12.

At 1610 the base station 105 may categorize, by TTI duration, the TTIs of the set of CCs into respective groups of TTIs. The operations of 1610 may be performed according to the methods described herein. In certain examples, aspects of the operations of 1610 may be performed by a base station TTI manager as described with reference to FIGS. 9 through 12.

At 1615 the base station 105 may determine a reserved power for each respective group of TTIs of the set of CCs based on the TTI duration. The operations of 1615 may be performed according to the methods described herein. In certain examples, aspects of the operations of 1615 may be performed by a base station reserved power manager as described with reference to FIGS. 9 through 12.

At 1620 the base station 105 may transmit, to a UE 115, power reservation information that indicates the reserved power for each respective group of TTIs. The operations of 1620 may be performed according to the methods described herein. In certain examples, aspects of the operations of 1620 may be performed by a power reservation component as described with reference to FIGS. 9 through 12.

Figure 17:
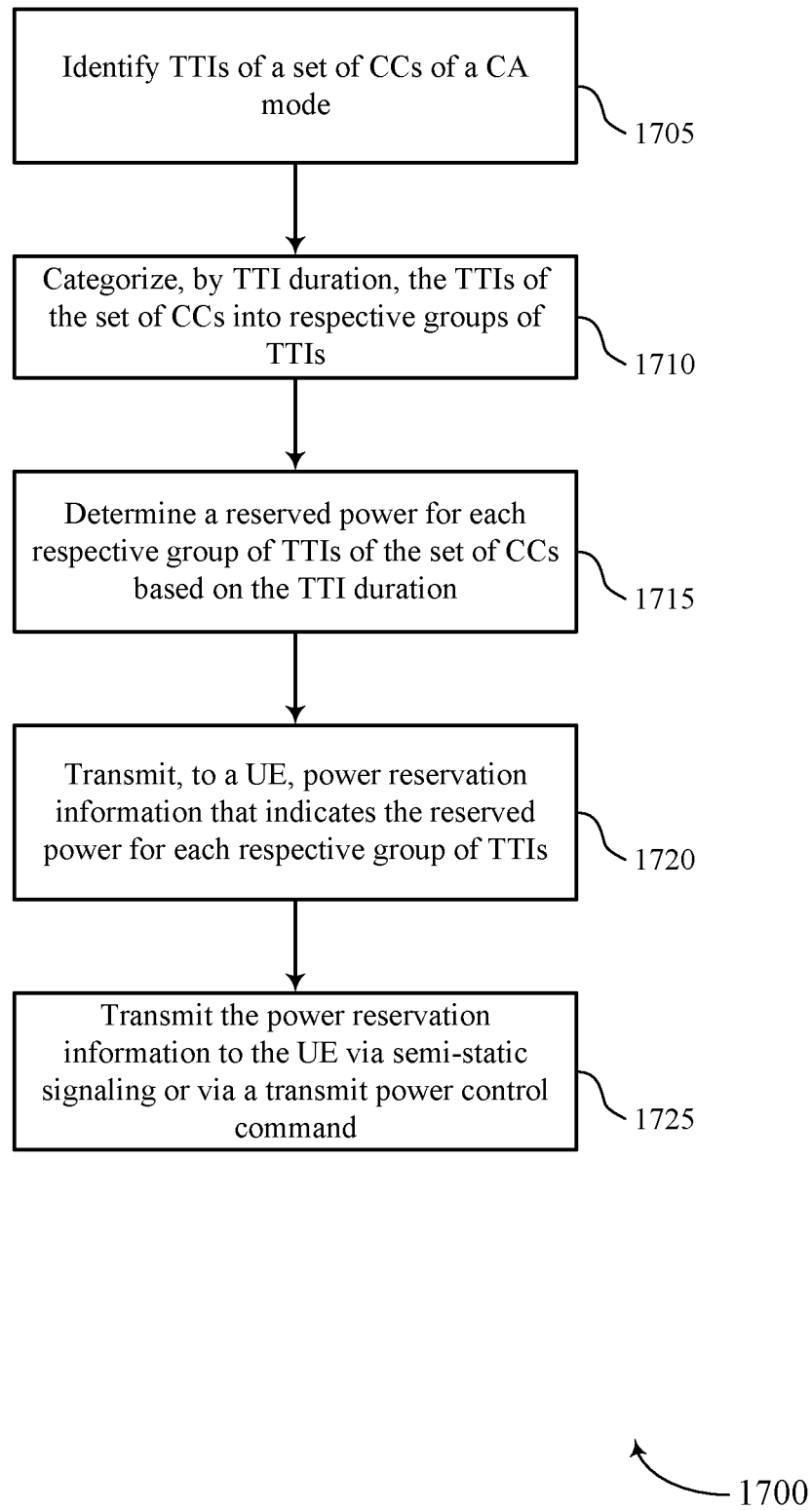

FIG. 17 shows a flowchart illustrating a method 1700 for power reservation and dropping rules for TTIs in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify TTIs of a set of CCs of a CA mode. The operations of 1705 may be performed according to the methods described herein. In certain examples, aspects of the operations of 1705 may be performed by a base station TTI manager as described with reference to FIGS. 9 through 12.

At 1710 the base station 105 may categorize, by TTI duration, the TTIs of the set of CCs into respective groups of TTIs. The operations of 1710 may be performed according to the methods described herein. In certain examples, aspects of the operations of 1710 may be performed by a base station TTI manager as described with reference to FIGS. 9 through 12.

At 1715 the base station 105 may determine a reserved power for each respective group of TTIs of the set of CCs based on the TTI duration. The operations of 1715 may be performed according to the methods described herein. In certain examples, aspects of the operations of 1715 may be performed by a base station reserved power manager as described with reference to FIGS. 9 through 12.

At 1720 the base station 105 may transmit, to a UE 115, power reservation information that indicates the reserved power for each respective group of TTIs. The operations of 1720 may be performed according to the methods described herein. In certain examples, aspects of the operations of 1720 may be performed by a power reservation component as described with reference to FIGS. 9 through 12.

At 1725 the base station 105 may transmit the power reservation information to the UE via semi-static signaling or via a transmit power control command. The operations of 1725 may be performed according to the methods described herein. In certain examples, aspects of the operations of 1725 may be performed by a power reservation component as described with reference to FIGS. 9 through 12.

Figure 18:
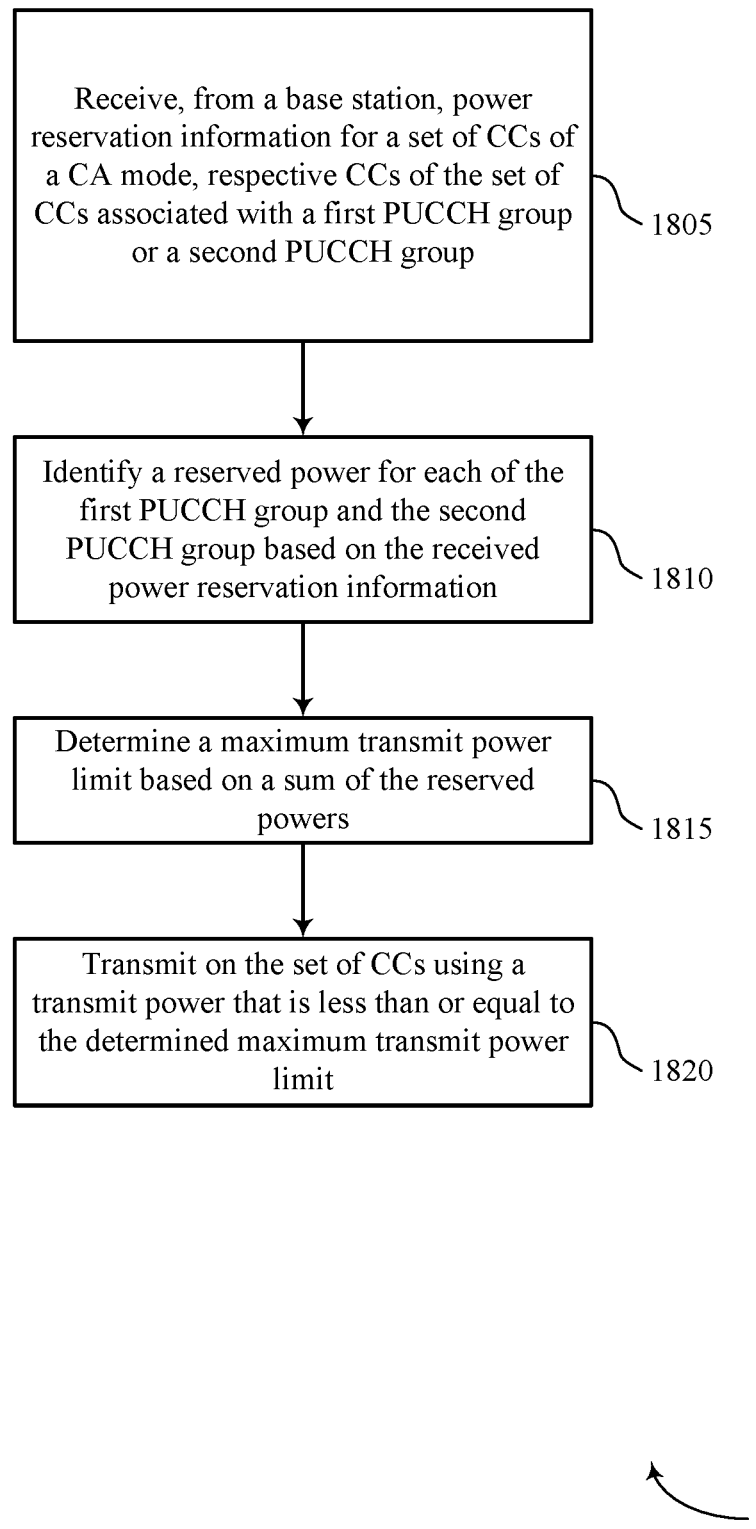

FIG. 18 shows a flowchart illustrating a method 1800 for power reservation and dropping rules for TTIs in accordance with aspects of the present disclosure. The operations of method 1800 may be implemented by a UE 115 or its components as described herein. For example, the operations of method 1800 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive, from a base station, power reservation information for a set of CCs of a CA mode, respective CCs of the set of CCs associated with a first PUCCH group or a second PUCCH group. The operations of 1805 may be performed according to the methods described herein. In certain examples, aspects of the operations of 1805 may be performed by a transmission power manager as described with reference to FIGS. 5 through 8.

At 1810 the UE 115 may identify a reserved power for each of the first PUCCH group and the second PUCCH group based on the received power reservation information. The operations of 1810 may be performed according to the methods described herein. In certain examples, aspects of the operations of 1810 may be performed by a PUCCH group manager as described with reference to FIGS. 5 through 8.

At 1815 the UE 115 may determine a maximum transmit power limit based on a sum of the reserved powers. The operations of 1815 may be performed according to the methods described herein. In certain examples, aspects of the operations of 1815 may be performed by a transmission power manager as described with reference to FIGS. 5 through 8.

At 1820 the UE 115 may transmit on the set of CCs using a transmit power that is less than or equal to the determined maximum transmit power limit. The operations of 1820 may be performed according to the methods described herein. In certain examples, aspects of the operations of 1820 may be performed by a uplink transmission component as described with reference to FIGS. 5 through 8.

Figure 19:
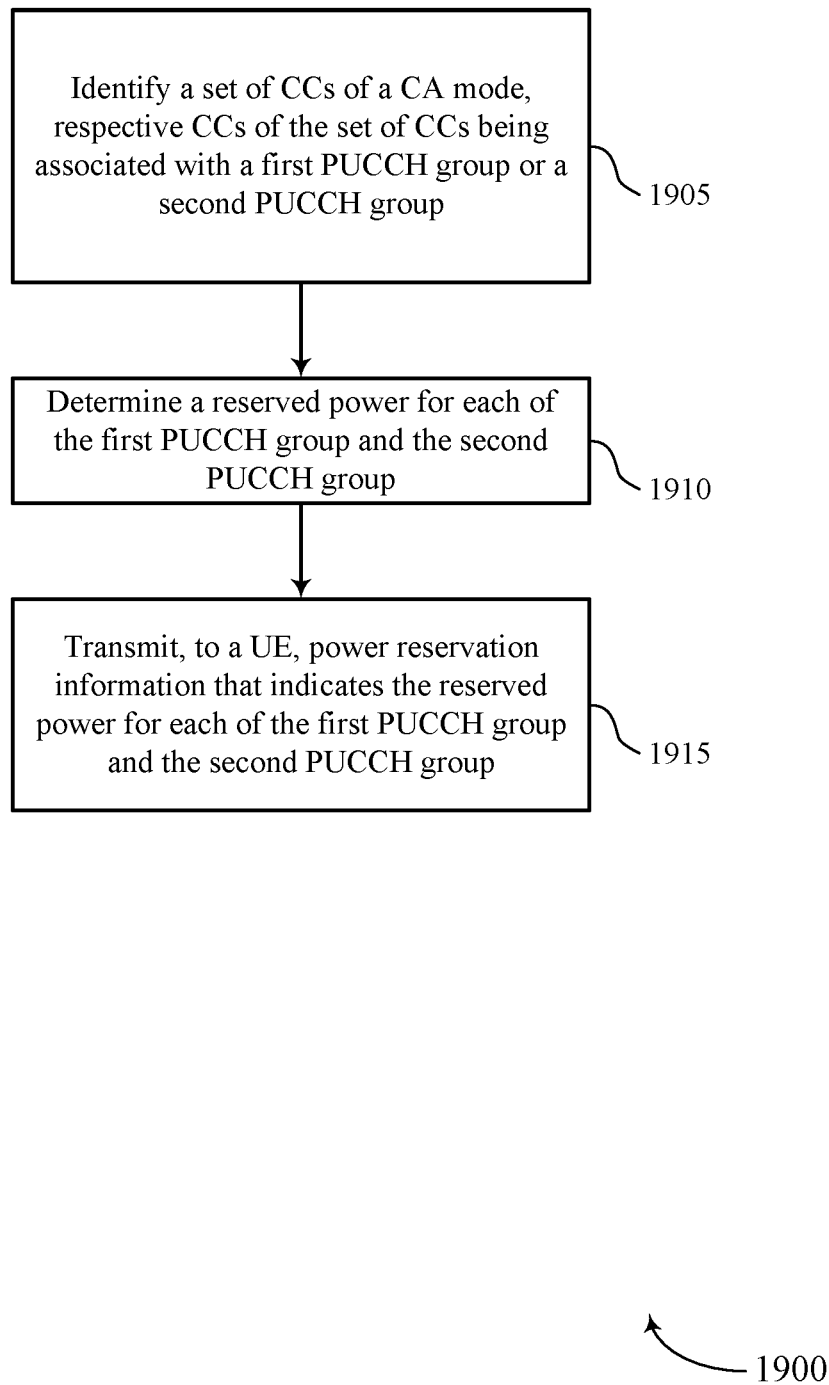

FIG. 19 shows a flowchart illustrating a method 1900 for power reservation and dropping rules for TTIs in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify a set of CCs of a CA mode, respective CCs of the set of CCs being associated with a first PUCCH group or a second PUCCH group. The operations of 1905 may be performed according to the methods described herein. In certain examples, aspects of the operations of 1905 may be performed by a CC manager as described with reference to FIGS. 9 through 12.

At 1910 the base station 105 may determine a reserved power for each of the first PUCCH group and the second PUCCH group. The operations of 1910 may be performed according to the methods described herein. In certain examples, aspects of the operations of 1910 may be performed by a base station reserved power manager as described with reference to FIGS. 9 through 12.

At 1915 the base station 105 may transmit, to a UE, power reservation information that indicates the reserved power for each of the first PUCCH group and the second PUCCH group. The operations of 1915 may be performed according to the methods described herein. In certain examples, aspects of the operations of 1915 may be performed by a power reservation component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB.

An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP), an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying transmission time intervals (TTIs) of a set of component carriers (CCs) of a carrier aggregation (CA) mode;
    categorizing, by TTI duration, the TTIs of the set of CCs into respective groups of TTIs;
    determining a reserved power for each respective group of TTIs of the set of CCs based at least in part on the TTI duration and an additional reserved power associated with a maximum transmit power limit of a user equipment (UE); and transmitting, to the UE, power reservation information that indicates the reserved power for each respective group of TTIs and an indication of the additional reserved power.

2. The method of claim 1, wherein transmitting the power reservation information and the indication of the additional reserved power further comprises:

transmitting the power reservation information and the indication of the additional reserved power to the UE via semi-static signaling or via a transmit power control command.

3. The method of claim 2, wherein the semi-static signaling comprises radio resource control (RRC) messaging.

4. The method of claim 1,
wherein a sum of the reserved powers and the additional reserved power is less than or equal to the maximum transmit power limit.

5. An apparatus for wireless communication, comprising:
a processor, and
a memory coupled with the processor, wherein the memory comprises
instructions executable by the processor to cause the apparatus to:
identify transmission time intervals (TTIs) of a set of component carriers (CCs) of a carrier aggregation (CA) mode;
categorize, by TTI duration, the TTIs of the set of CCs into respective groups of TTIs;
determine a reserved power for each respective group of TTIs of the set of CCs based at least in part on the TTI duration and an additional reserved power associated with a maximum transmit power limit of a user equipment (UE); and
transmit, to UE, power reservation information that indicates the reserved power for each respective group of TTIs and an indication of the additional reserved power.

6. The apparatus of claim 5, wherein the instructions to transmit the power reservation information and the indication of the additional reserved power are further executable by the processor to cause the apparatus to:
transmit the power reservation information and the indication of the additional reserved power to the UE via semi-static signaling or via a transmit power control command.

7. The apparatus of claim 6, wherein the semi-static signaling comprises radio resource control (RRC) messaging.

8. The apparatus of claim 5,
wherein a sum of the reserved powers and the additional reserved power is less than or equal to the maximum transmit power limit.

9. A non-transitory computer readable medium, wherein the computer readable medium comprises coded instructions that, when executed by a processor, cause a wireless communication device to:

identify transmission time intervals (TTIs) of a set of component carriers (CCs) of a carrier aggregation (CA) mode;
categorize, by TTI duration, the TTIs of the set of CCs into respective groups of TTIs;
determine a reserved power for each respective group of TTIs of the set of CCs based at least in part on the TTI duration and an additional reserved power associated with a maximum transmit power limit of a user equipment (UE); and
transmit, to the UE, power reservation information that indicates the reserved power for each respective group of TTIs and an indication of the additional reserved power.

10. The computer readable medium of claim 9, wherein the instructions to transmit the power reservation information and the indication of the additional reserved power are further executable by the processor to cause the device to:
transmit the power reservation information and the indication of the additional reserved power to the UE via semi-static signaling or via a transmit power control command.

11. The computer readable medium of claim 10, wherein the semi-static signaling comprises radio resource control (RRC) messaging.

12. The computer readable medium of claim 9,
wherein a sum of the reserved powers and the additional reserved power is less than or equal to the maximum transmit power limit.

13. An apparatus for wireless communication, comprising:
means for identifying transmission time intervals (TTIs) of a set of component carriers (CCs) of a carrier aggregation (CA) mode;
means for categorizing, by TTI duration, the TTIs of the set of CCs into respective groups of TTIs;
means for determining a reserved power for each respective group of TTIs of the set of CCs based at least in part on the TTI duration and an additional reserved power associated with a maximum transmit power limit of a user equipment (UE); and
means for transmitting, to the UE, power reservation information that indicates the reserved power for each respective group of TTIs and an indication of the additional reserved power.

14. The apparatus of claim 13, wherein the means for transmitting the power reservation information and the indication of the additional reserved power transmits the power reservation information and the indication of the additional reserved power to the UE via semi-static signaling or via a transmit power control command.

15. The apparatus of claim 14, wherein the semi-static signaling comprises radio resource control (RRC) messaging.

16. The apparatus of claim 13,
wherein a sum of the reserved powers and the additional reserved power is less than or equal to the maximum transmit power limit.

* * * * *